United States Patent
Czaplewski

(10) Patent No.: US 12,202,995 B2
(45) Date of Patent: *Jan. 21, 2025

(54) REVERSE PHOTOCHROMIC INKS, AND ASSOCIATED METHODS AND WRITING INSTRUMENTS

(71) Applicant: Sanford L.P., Atlanta, GA (US)

(72) Inventor: Kenneth Czaplewski, Westmont, IL (US)

(73) Assignee: Sanford, L.P., Atlanta, GA (US)

( * ) Notice: Subject to any disclaimer, the term of this patent is extended or adjusted under 35 U.S.C. 154(b) by 323 days.

This patent is subject to a terminal disclaimer.

(21) Appl. No.: 17/761,752

(22) PCT Filed: Sep. 23, 2020

(86) PCT No.: PCT/US2020/052196
§ 371 (c)(1),
(2) Date: Mar. 18, 2022

(87) PCT Pub. No.: WO2021/061757
PCT Pub. Date: Apr. 1, 2021

(65) Prior Publication Data
US 2022/0372321 A1    Nov. 24, 2022

Related U.S. Application Data

(60) Provisional application No. 62/904,889, filed on Sep. 24, 2019, provisional application No. 62/904,900, filed on Sep. 24, 2019.

(51) Int. Cl.
C09D 11/00    (2014.01)
C09D 11/17    (2014.01)
C09D 11/18    (2006.01)
C09D 11/50    (2014.01)

(52) U.S. Cl.
CPC .............. *C09D 11/50* (2013.01); *C09D 11/17* (2013.01); *C09D 11/18* (2013.01)

(58) Field of Classification Search
CPC ................................ C09D 11/17; C09D 11/18
USPC ....................... 106/31.01, 31.13, 31.6, 31.92
See application file for complete search history.

(56) References Cited

U.S. PATENT DOCUMENTS

| | | |
|---|---|---|
| 2006/0053975 A1 | 3/2006 | Shibahashi et al. |
| 2008/0085384 A1 | 4/2008 | Ylitao et al. |
| 2012/0038718 A1 | 2/2012 | Kazmaier et al. |
| 2016/0024321 A1* | 1/2016 | Wang ................. C09D 11/50 523/122 |
| 2017/0058139 A1 | 3/2017 | Clayton et al. |
| 2019/0284406 A1 | 9/2019 | Levine et al. |

OTHER PUBLICATIONS

Tinuvin 477-DW Technical Data Sheet (BASF), Dec. 2010, pp. 1-3.
International Search Report of PCT/US2020/052196 dated Aug. 2, 2021.

* cited by examiner

*Primary Examiner* — James E McDonough
(74) *Attorney, Agent, or Firm* — Eversheds Sutherland (US) LLP

(57) ABSTRACT

Reverse photochromic ink formulations containing at least one reverse photochromic colorant, methods of erasing reverse photochromic ink formulations by exposing them to UV light, and writing instruments including a writing tip portion connected to a light-shielding tubular member or refill and a reverse photochromic ink formulation are provided herein.

19 Claims, 18 Drawing Sheets

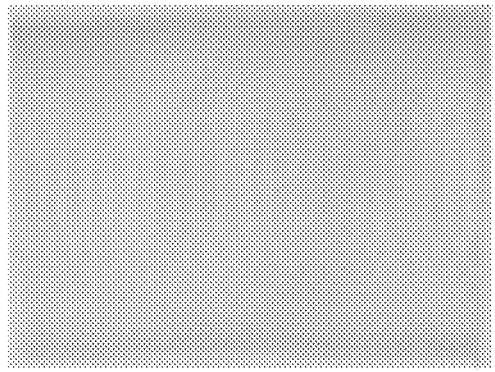
301
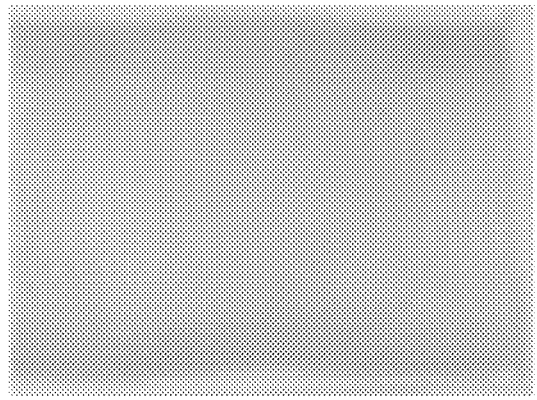
303
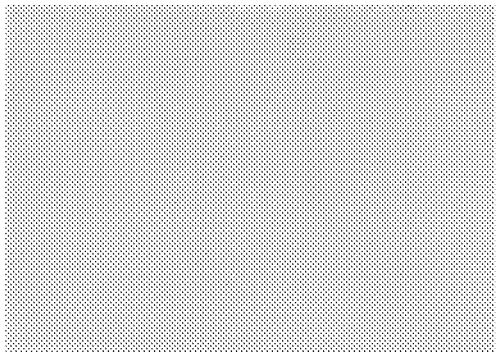
305
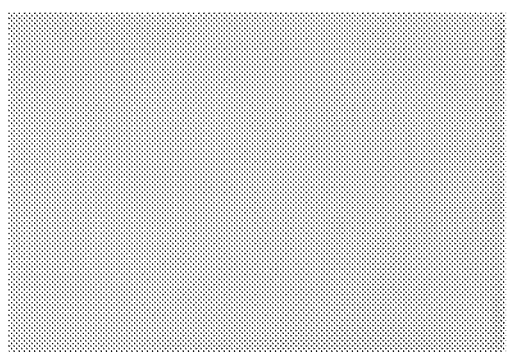
307
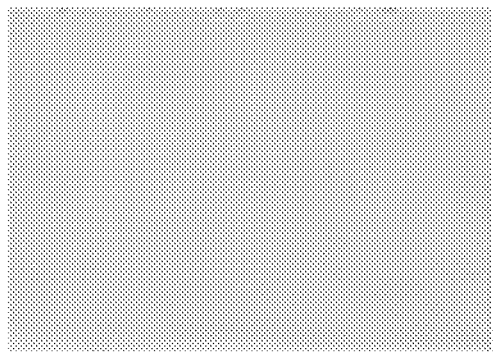
309
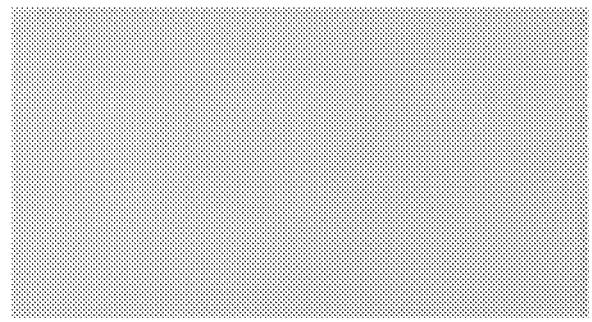
311
FIG. 3

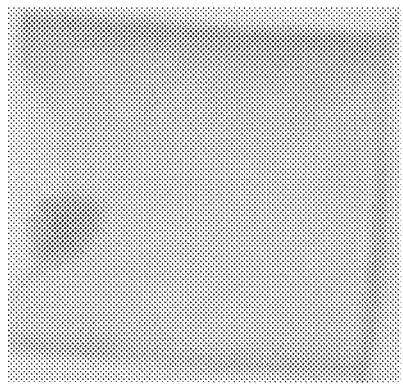
401
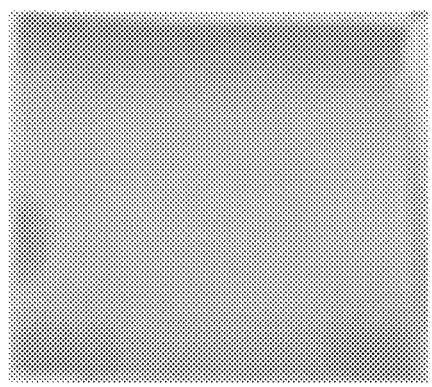
403
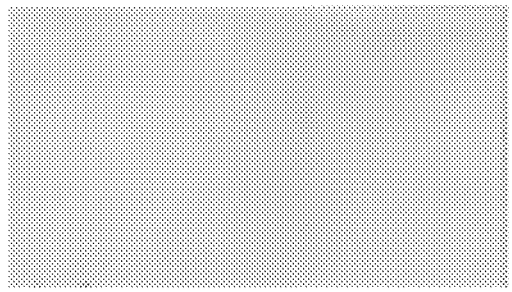
405
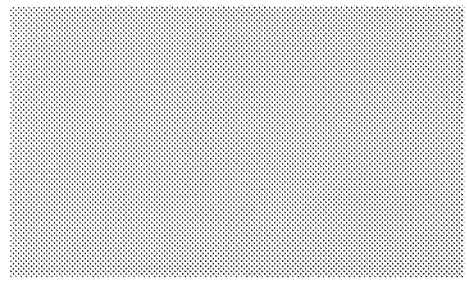
407
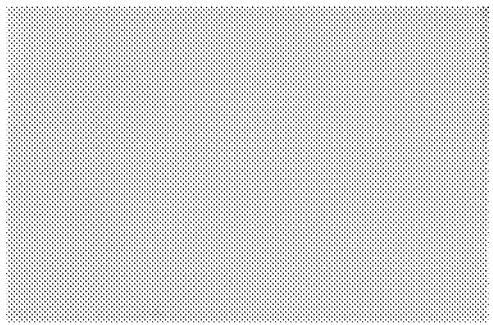
409
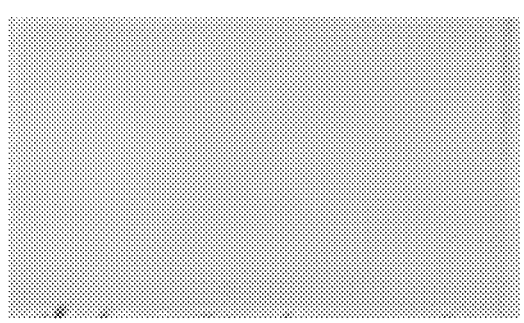
411
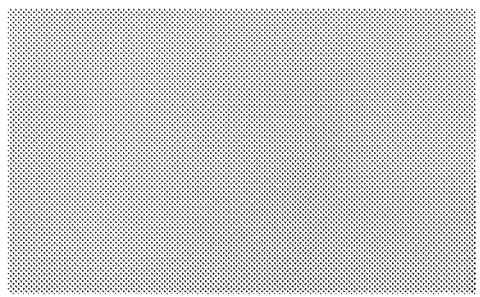
413
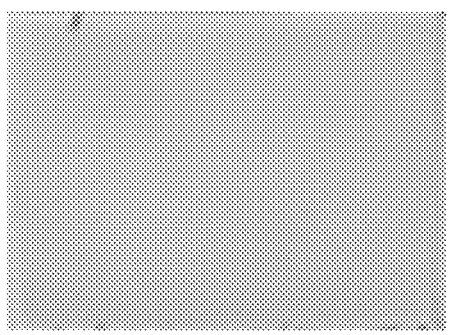
415
FIG. 4

501      503
505      507
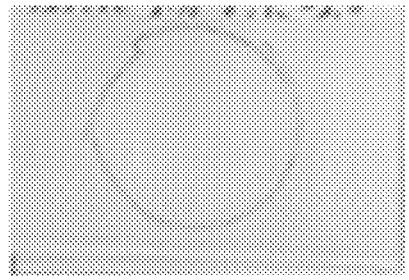
509      511
513      515
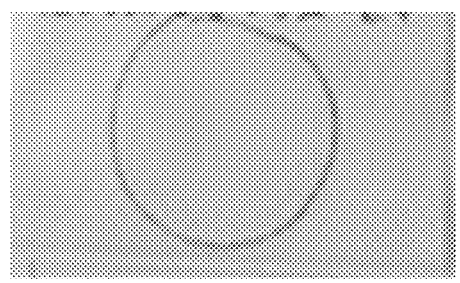
517      FIG. 5      519

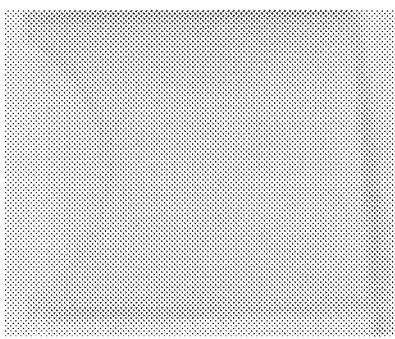
801
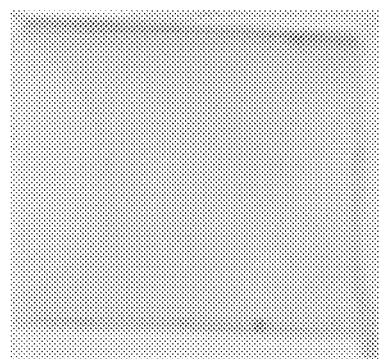
803
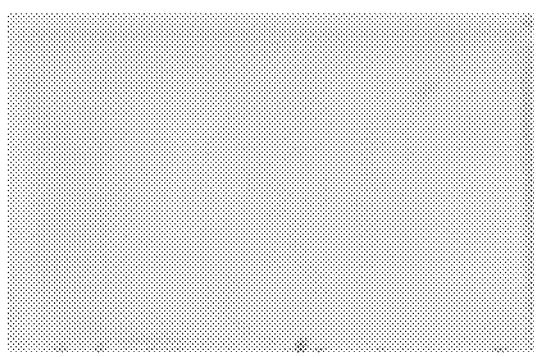
805
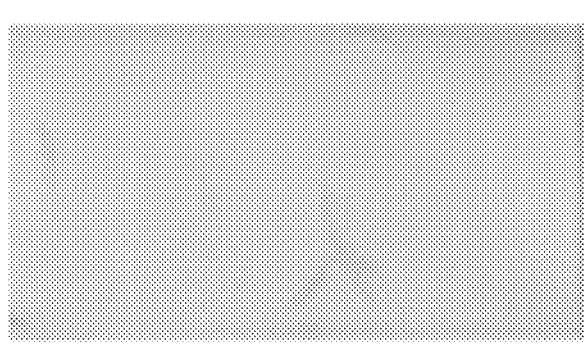
807
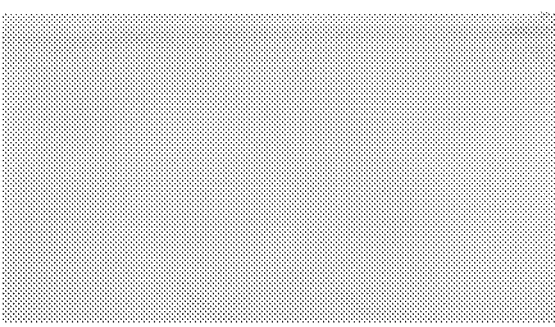
809
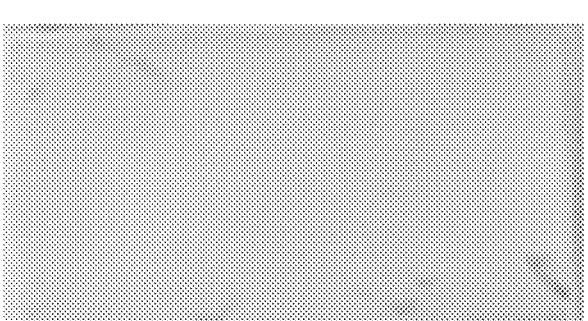
811
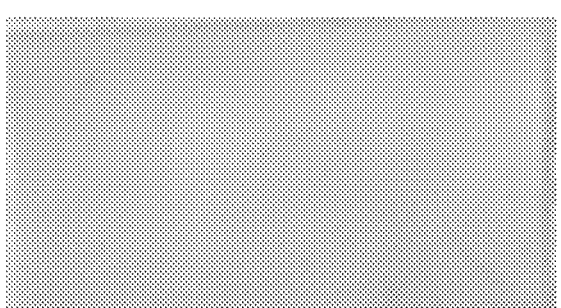
813
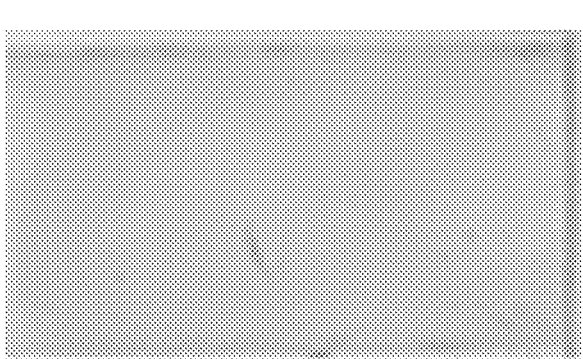
815
FIG. 8

REVERSE PHOTOCHROMIC INKS, AND ASSOCIATED METHODS AND WRITING INSTRUMENTS

CROSS REFERENCE TO RELATED APPLICATIONS

This application is a 35 U.S.C. § 371 national stage application of PCT Patent Application No. PCT/US2020/052196, filed Sep. 23, 2020, which claims priority benefit of U.S. Provisional Application No. 62/904,889, filed Sep. 24, 2019, and U.S. Provisional Application No. 62/904,900, filed Sep. 24, 2019, the disclosures of which are incorporated by reference herein in their entirety.

BACKGROUND

This disclosure generally relates to ink formulations, and associated methods and writing instruments, and more specifically relates to reverse photochromic inks, and methods and writing instruments for using the same.

Inks that are erasable as a result of physical contact (e.g., rubbing) between the ink and an eraser and writing instruments configured for the same are known. However, many of these erasable ink compositions are very difficult to erase, and are still at least partially visible even after erasing. Further, erasing these inks may cause damage to the underlying substrate, such as tearing of the substrate. Accordingly, there is a need for improved erasable ink compositions and writing instruments.

BRIEF DESCRIPTION OF THE DRAWINGS

FIG. 3 is a series of photographs of write test samples made using two embodiments of a reverse photochromic ink formulation, before and after exposure to UV light.

FIG. 4 is a series of photographs of write test samples made using the reverse photochromic ink formulations tested in FIG. 3, before and after exposure to UV light.

FIG. 5 is a series of photographs of write test samples made using an embodiment of a reverse photochromic ink formulation, before and after exposure to UV light from two sources.

FIG. 8 is a series of photographs of write test samples made using two embodiments of a reverse photochromic ink formulation, before and after exposure to UV light.

DETAILED DESCRIPTION

Figure 1:
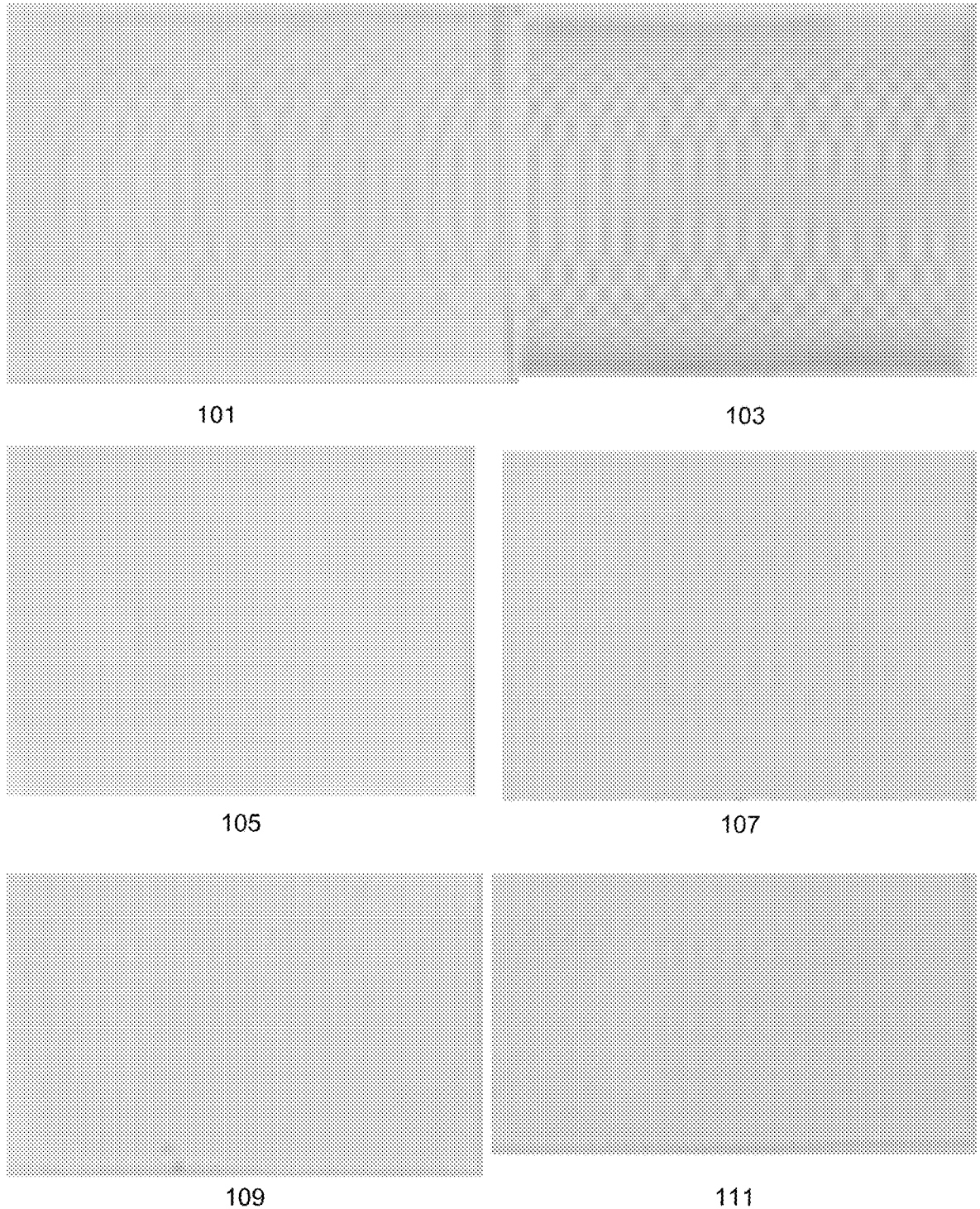
FIG. 1 is a series of photographs of write test samples made using two embodiments of a reverse photochromic ink formulation, before and after exposure to UV light.

Reverse photochromic ink formulations, methods of using (e.g., erasing) reverse photochromic ink formulations, and writing instruments including reverse photochromic ink formulations are provided herein.

As used herein, the term "UV light" is used broadly to refer to light having a wavelength of from about 100 nm to about 400 nm, and includes vacuum-UV, UV-C, UV-B, and UV-A light.

As used herein, the term "reverse photochromic" is used broadly to refer to a substance which is initially colored or opaque and which, upon exposure to light, becomes transparent or translucent. In some embodiments, the measured L* value of a reverse photochromic substance is initially smaller, prior to substantial exposure to light, and is larger upon exposure to light. In some embodiments, the light is UV light.

As used herein, the term "colorant" is used broadly to refer to a substance that imparts a desired color to an ink formulation. For example, a colorant may be a dye or pigment.

As used herein, the term "erased" is used broadly to indicate that at least a portion of the colored components of an ink formulation has been removed from a substrate, or have been rendered colorless or transparent. As used herein, the phrase "substantially erased" is used broadly to indicate that substantially all of the colored components of an ink formulation have been removed from a substrate, or have been rendered colorless or transparent.

Reverse Photochromic Ink Formulations

Reverse photochromic ink formulations are disclosed herein. In some embodiments, the ink formulation may consist only of one or more reverse photochromic colorants. In some embodiments, the reverse photochromic colorants may include a photochromic dye and an activator or bleaching agent that renders the dye colorless upon exposure to UV light. For example, reverse photochromic colorants manufactured by and commercially available from Spectra Group Ltd. (Ohio, USA), including: CR234-BT2B, CR234-R33, CR234-R33x2, and CR234-V4, may be used as reverse photochromic colorants in embodiments of ink formulations of the present disclosure. The CR234-BT2B colorant is initially blue and, upon exposure to UV light, transitions from blue to clear. The CR234-R33 and CR234-R33x2 colorants are initially red and, upon exposure to UV light, transition from red to clear. The CR234-V4 colorant is initially violet and, upon exposure to UV light, transitions from violet to clear. For example, in some embodiments, the ink formulation includes CR234-BT2B, CR234-R33, CR234-R33x2, CR234-V4, or any combination thereof, without any additional ingredients. In some embodiments, the ink formulation contains the colorant in an amount of from about 20 wt. % to about 80 wt. %, for example about 20 wt. %, about 30 wt. %, about 40 wt. %, about 50 wt. %, about 60 wt. %, about 70 wt. %, or 80 wt. %, about 90 wt. %, about 90 wt. %, or any ranges therebetween.

In some embodiments, the ink formulation includes a resin. In some embodiments, the resin may include a variety of synthetic resin emulsions, such as aqueous dispersions of polyacrylic acid esters, styrene-acrylate copolymers, polyvinyl acetate, ethylene-vinyl acetate copolymers, ethylene methacrylic acid copolymers, α-olefin-maleic acid copolymers, silicone resins, polyester and polyurethane, water-soluble resins such as polyvinyl alcohols, polyvinyl pyrrolidone and polyvinyl butyral, alkali-soluble resins such as styrene-maleic acid copolymers, ethylene-maleic acid copolymers and styrene-acrylate copolymers, oil-soluble resins such as ketone resins, ketone-formaldehyde resins, amide resins, alkyd resins, rosin-modified resins, rosin-modified phenol resins, phenol resins, xylene resins, polyvinyl pyrrolidone, α- and β-pinene-phenol polycondensation resins, polyvinyl butyral resins and acrylic resins.

In some embodiments, the resin is an acrylic resin. In some embodiments, the acrylic resin is a water-based acrylic resin, for example Joncryl® 67, Joncryl® 678, Joncryl® 682, Joncryl® 683, or combinations thereof, which are all commercially available from BASF (Germany).

In some embodiments, the ink formulation includes the resin in an amount of from about 0.01 wt. % to about 50 wt. %, for example about 0.01 wt. %, about 10 wt. %, about 20 wt. %, about 30 wt. %, about 40 wt. %, or about 50 wt. %.

In some embodiments, the ink formulation includes a solvent. In some embodiments, the solvent is water. In some embodiments, the solvent is one or more alcohols, for example, benzyl alcohol, ethanol, n-propanol, isopropanol, n-butanol, diacetone alcohol, or combinations thereof. In some embodiments, the solvent is a water-soluble organic solvent, for example, ethanol, propanol, butanol, glycerin, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ethers propylene glycol monobutyl ether, ethylene glycol monomethyl ether acetate, sulfolane, 2-pyrrolidone, N-methyl-2-pyrrolidone and the like. In some embodiments, the solvent is an organic solvent, for example, naphtha, VM&P naphtha, refined solvent naphtha, petroleum sprit, xylene, methylisobutyl ketone, or butyl propionate.

In some embodiments, the ink formulation contains the solvent in an amount of from about 0.01 wt. % to about 80 wt. %, for example about 0.01 wt. %, about 10 wt. % solvent, about 20 wt. %, about 30 wt. %, about 40 wt. %, about 50 wt. %, about 60 wt. %, about 70 wt. %, about 80 wt. %, or any ranges therebetween.

In some embodiments, the ink formulation includes one or more shear-thinning imparting agents, for example, non-ionic surfactants having a specific HLB value, xanthan gum, welan gum, succinoglycan (organic acid-modified heteroglycan composed of glucose unit and galactose unit, having an average molecular weight of about 100 to 8,000,000), guar gum, locust bean gum, hydroxyethyl cellulose, alkyl alginates, polymers mainly composed of alkyl methacrylate and having a molecular weight of 100,000 to 150,000, glycomannan, hydrocarbons having a gelling ability and extracted from seaweed such as agar or carrageenan, benzylidenesorbitol or derivatives thereof, crosslinking acrylic acid polymers and the like, hydrophobically-modified ethoxylated urethane (HEUR) thickeners, alkalai-swellable emulsion (ASE) thickeners, hydrophobically-modified alkali-swellable emulsion (HASE) thickeners, associative thickeners, and non-associative thickeners are used alone or mixed in combination.

In some embodiments, the ink formulation includes one or more other additives such as pigments, binders, viscosity modifiers, thixotropic agents, preservatives, lubricants, pH adjustors, antiseptics or fungicides, wetting agents, defoamers, dispersants, surfactants, humectants, biocides, and the like.

In some embodiments, the ink formulation does not contain polyvinyl alcohol, polyamide, methyl hydroxypropyl cellulose, Selvol™ 203 (commercially available from Sekisui, Japan), Selvol™ 205, Versamid® 759 (commercially available from BASF), Versamid® 917, or Tylose® PS0810001 (commercially available from Shin Etsu, Germany).

In some embodiments, the ink formulation may be configured to be delivered from a marker type writing instrument, such as a Sharpie® pen. In some embodiments, the ink formulation may be configured to be delivered from a roller ball or ballpoint pen. In some embodiments, the ink formulation may be configured to be delivered from a gel pen. In some embodiments, the ink formulation may be configured to be delivered from a writing brush pen. In some embodiments, the ink formulation may be configured to be delivered from a marker or highlighter. In some embodiments, the ink formulation may be configured to be deposited onto a substrate by dip-coating, flexo-printing, gravure printing, offset printing, inkjet printing, stamping, spraying, brushing, rolling, puffing, or any combination thereof.

Methods of Using/Erasing Reverse Photochromic Inks

In some embodiments, methods of using and erasing reverse photochromic ink are provided. In some embodiments, any of the ink formulations described above is disposed on a surface (e.g., via contacting a writing instrument containing the ink formulation to the surface such that the ink is delivered from the instrument to the surface), and then the surface is exposed to light. In some embodiments, the surface is paper. In some embodiments, the light is ambient light. In some embodiments, the light is sunlight. In some embodiments, the light is UV light. In some embodiments, the UV light has a wavelength of from about 315 nm to about 400 nm. In some embodiments, the light is provided by a portion of a writing instrument. In some embodiments, the light is provided by a source separate from the writing instrument. In some embodiments, the surface is exposed to light for a duration of from about 0.1 seconds to about 2 hours, for example about 0.1 seconds, about 1 second, about 5 seconds, about 20 seconds, about 1 minute, about 5 minutes, about 10 minutes, about 20 minutes, about 30 minutes, about 40 minutes, about 50 minutes, about 60 minutes, about 70 minutes, about 80 minutes, about 90 minutes, about 100 minutes, about 110 minutes, about 120 minutes, and any ranges therebetween.

In some embodiments, the ink formulations may be considered erased when each formulation would be considered erased by an average consumer's visual inspection. Thus, in some embodiments, determining whether an ink formulation has been erased may involve a qualitative determination.

In some embodiments, the erasure of the ink formulations described herein may be evaluated using the Likert scale, wherein write test samples may be evaluated before and after attempted erasing on a 5-point scale. According to the Likert scale, 5 represents no color change, 4 represents slight discoloration, 3 represents moderate discoloration, 2 represents severe discoloration, and 1 represents complete color elimination. In some embodiments, the ink formulations may be considered erased when they are rated with a moderate discoloration, severe discoloration, or complete color elimination according to the Likert scale.

In some embodiments, the color of an ink formulation before and after exposure to UV light may be quantitatively evaluated with a color measurement instrument. In some embodiments, the color measurement instrument may be a spectrophotometer, while in some embodiments the color measurement instrument may be a spectrodensitometer.

In some embodiments, color differences may be identified using the Commission Internationale de l'Eclairage (CIE) L*a*b* coordinates, wherein L* indicates lightness, a* is the red/green coordinate, and b* is the yellow/blue coordinate. The larger the L* value, the lighter the color, and the smaller the L* value, the darker the color. The larger the a* value, the redder the color, the smaller the a* value the greener the color. The larger the b* value, the yellower the b* value, and the smaller the b* value, the bluer the color. The color change of the ink formulation from its state before exposure to UV light ($L^*_1$, $a^*_1$, and $b^*_1$) and after exposure to UV light $L^*_2$, $a^*_2$, and $b^*_2$ can be indicated by calculating ΔL*, Δa*, and Δb*, according to the formulas below:

$$\Delta L^* = L^*_2 - L^*_1$$

$$\Delta a^* = a^*_2 - a^*_1$$

$$\Delta b^* = b^*_2 - b^*_1$$

A positive ΔL* will indicate that the sample became lighter after exposure to UV light, while a negative ΔL* will indicate that the sample became darker after exposure to UV light. For example, a positive ΔL* when measuring the effect of UV light on a colored reverse photochromic ink on a white substrate may indicate that the reverse photochromic ink was lightened by exposure to UV light.

A positive Δa* will indicate that the sample became redder after exposure to UV light, while a negative Δa* will indicate that the sample became greener after exposure to UV light. For example, a positive Δa* when measuring the effect of UV light on a green colored reverse photochromic ink on a white substrate may indicate that the green color of the reverse photochromic ink was at least partially removed by exposure to UV light.

A positive Δb* will indicate that the sample became yellower after exposure to UV light, while a negative Δb* will indicate that the sample became bluer after exposure to UV light. For example, a positive Δa* when measuring the effect of UV light on a blue colored reverse photochromic ink on a white substrate may indicate that the blue color of the reverse photochromic ink was at least partially removed by exposure to UV light. As would be readily understood by one of skill in the art, measuring Δa* and Δb* may be particularly useful in evaluating the erasability of reverse photochromic inks which are initially red or blue in color.

The total color difference between all three coordinates L*, a*, and b* can be evaluated by calculating the total color difference, ΔE*, according to the formula below:

$$\Delta E^* = [i\Delta L^* \cdot 2 + \Delta a^* 2 + \Delta b^* \cdot 2]/2$$

In some embodiments, the ink formulations may be considered erased when write test samples of the ink on a white substrate exhibit a ΔE* value of from about 40 to about 100, a ΔL* value of from about 1 to about 100, a Δa* value of from about +/−0.1 to about +/−Δb* value of from about +/−0.1 to about +/−90, or any combination thereof, including any ranges therebetween. For example, in some embodiments, the ink formulations may be considered erased when write test samples of the ink on a white substrate exhibit a ΔE* value of from about 40 to about 50, from about 50 to about 80, about 50, about 60, about 70, about 80, about 90, about 95, about 100, or any ranges therebetween. In some embodiments, the ink formulations may be considered erased when the write test samples of the ink on a white substrate exhibit a ΔL* value of from about 5 to about 40, from about 40 to about 60, from about 50 to about 95, about 1, about 10, about 20, about 30, about 40, about 50, about 60, about 70, about 80, about 90, about 95, about 100, or any ranges therebetween. In some embodiments, the ink formulations may be considered erased when the write test samples of the ink on a white substrate exhibit a Δa* value of from about −60 to about 60, from about −60 to about −0.1, from about 0.1 to about 90, from about −25 to about −5, from about 5 to about 25, from about −60 to about −30, from about 30 to about 60, for example about −90, about −80, about −70, about −60, about −50, about −40, about −30, about −20, about −10, about 0, about 10, about 20, about 30, about 40, about 50, about 60, about 70, about 80, about 90 or any ranges therebetween. In some embodiments, the ink formulations may be considered erased when the write test samples of the ink on a white substrate exhibit a Δb* value of from about −90 to about −50, about 50 to about 90, about −40 to about −20, about 20 to about 40, about −20 to about −0.1, about 0.1 to about 20, about −90, about −80, about −70, about −60, about −50, about −40, about −30, about −20, about −10, about −0.1, about 0.1, about 10, about 20, about 30, about 40, about 50, about 60, about 70, about 80, about 90, or any ranges therebetween.

In some embodiments, the color of an ink formulation before and after exposure to UV light may be evaluated using the CIE L*C*h coordinates, where L* indicates lightness, C* indicates chroma, and h is the hue angle. The color change of the ink formulation from its state before exposure to UV light ($L^*_1$, $C^*_1$, and $h_1$) and after exposure to UV light $L^*_2$, $C^*_2$, and $h_2$ can be indicated by calculating ΔL*, ΔC*, and Δh, according to the formulas below:

$$\Delta L^* = L^*_2 - L^*_1$$

$$\Delta C^* = C^*_2 - C = h_2 - h_1$$

In some embodiments, the ink formulations may be considered erased when the ink before and after exposure to UV light exhibits a $\Delta L^*$ value of from about 1 to about 100, $\Delta C^*$ value of from about 0.1 to about 90, a $\Delta h$ value of from about 1° to about 360°, or any combination thereof, including any ranges therebetween. For example, in some embodiments, the ink formulations may be considered erased when the write test samples of the ink on a white substrate exhibit a $\Delta L^*$ value of from about 5 to about 40, from about 40 to about 60, from about 50 to about 95, about 1, about 10, about 20, about 30, about 40, about 50, about 60, about 70, about 80, about 90, about 95, about 100, or any ranges therebetween. In some embodiments, the ink formulations may be considered erased when the write test samples of the ink on a white substrate exhibit a $\Delta C^*$ value of 0.1 to about 20, about 25 to about 70, about 75 to about 90, about 0.1, about 10, about 20, about 30, about 40, about 50, about 60, about 70, about 80, about 90, or any ranges therebetween. In some embodiments, the ink formulations may be considered erased when the write test samples of the ink on a white substrate exhibit a $\Delta h$ value of about 1°, about 30°, about 60°, about 90°, about 120°, about 150°, about 180°, about 210°, about 240°, about 270°, about 300°, about 330°, about 360°, or any ranges therebetween.

Writing Instruments

In some embodiments, writing instruments are provided. In some embodiments, the writing instruments include a writing tip portion connected to a light-shielding tubular member or refill, and any of the ink formulations described above. In some embodiments, the writing tip portion is a ballpoint. In some embodiments, the writing tip portion is a marker. In some embodiments, the writing tip portion is a brush tip. In some embodiments, the light-shielding tubular member or refill may block from about 50% to about 100% of light from contacting the ink formulation. In some embodiments, the light-shielding tubular member or refill may block anywhere from about 50% to about 100% of UV light from contacting the light formulation.

In some embodiments, the writing instrument further includes a UV-erasing portion. In some embodiments, the UV-erasing portion may include one or more UV light-generating elements. In some embodiments, the one or more UV light-generating elements may be an LED. In some embodiments, the UV-erasing portion is positioned opposite the writing tip portion. In some embodiments, the UV-erasing portion includes a UV light configured to generate at least 0.250 mW/cm$^2$ of 340 nm UV light.

Figure 14:
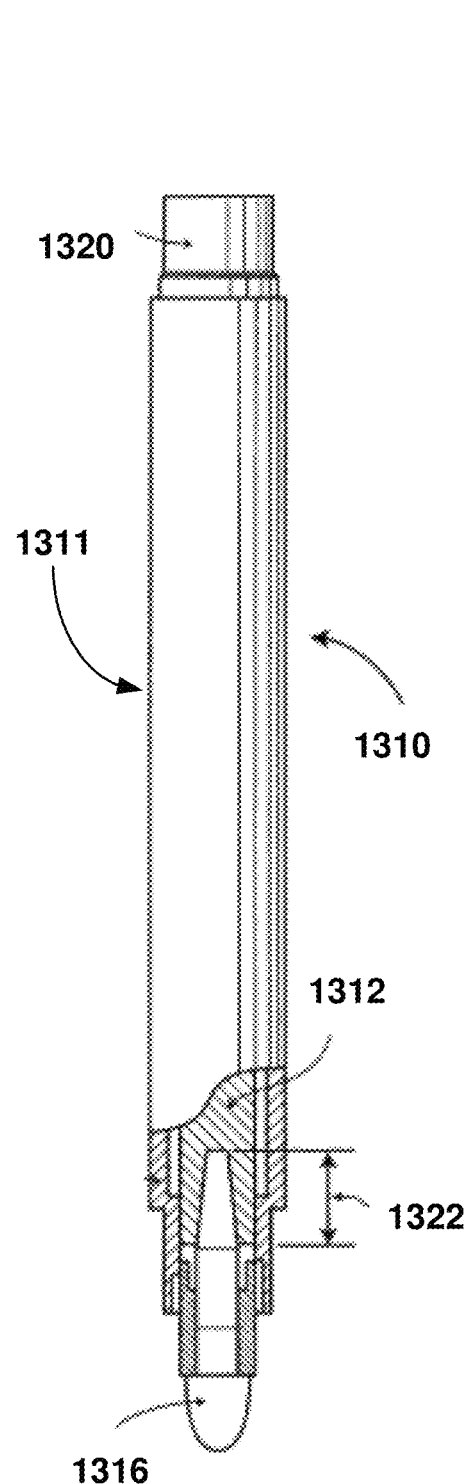
FIG. 14 is an embodiment of a marker type writing instrument including reverse photochromic ink.

FIG. 14 shows a partial cutaway view of an embodiment of a writing instrument 1310 according to the present disclosure. The writing instrument 1310 includes a light-shielding tubular body 1311 that surrounds a reservoir 1312 that may house any of the reverse photochromic ink formulations described above. The writing instrument further includes a writing tip 1316 that extends into the reservoir 1312 by a distance 1322. The light-shielding tubular body 1311 further includes a second end 1320 that is configured to receive a cap (not shown).

Figure 15:
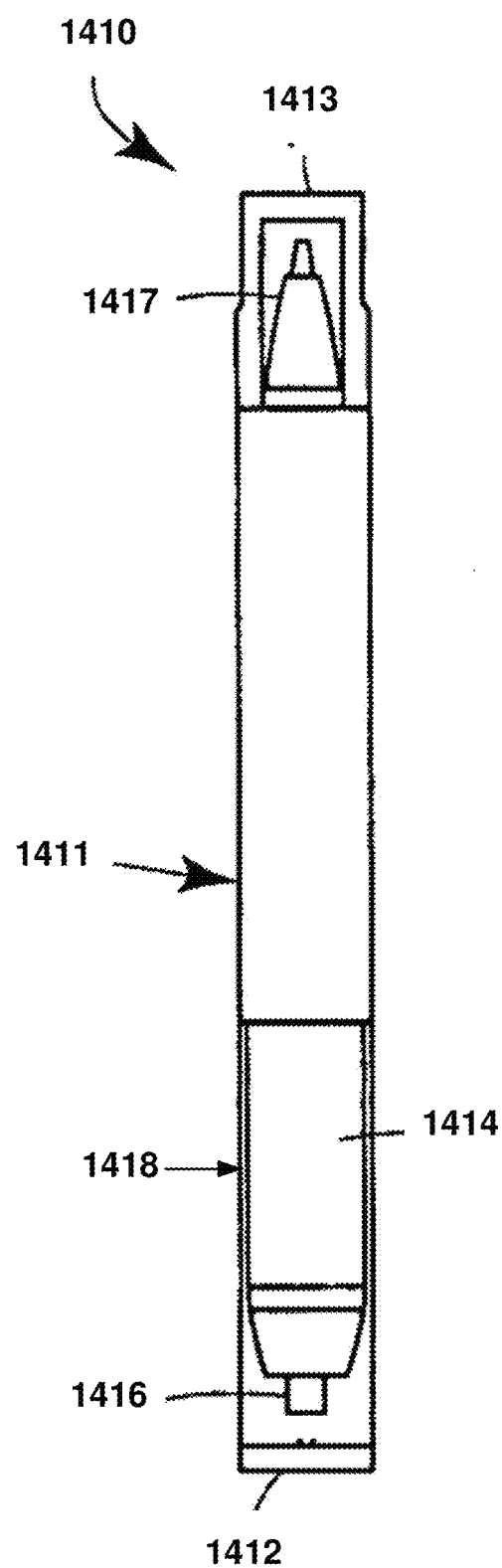
FIG. 15 is an embodiment of a ballpoint type writing including reverse photochromic ink.

FIG. 15 depicts a writing instrument 1410, which includes a light-shielding tubular member 1411 that may house any of the reverse photochromic ink formulations described above. The writing instrument includes a cap 1413 that is configured to removably cover the writing tip 1417. The writing tip 1417 may be of a roller ball type, porous tip type, or other configuration, and may or may not be retractable.

The writing instrument 1410 further includes a UV-erasing portion 1418, which is configured to generate UV light capable of erasing the reverse photochromic ink. The UV-erasing portion includes a battery 1414, an LED 1416, and a cap 1412, which is configured to removably cover the UV-erasing portion 1418.

Permanently Colored Reverse Photochromic Inks

While the above-described formulations provide for erasable reverse photochromic inks and associated methods and writing instruments, it should be noted that erasability of reverse photochromic systems may not always be desirable, such as when the reverse photochromic ink is used on a legal document or when the reverse photochromic ink may be inadvertently exposed to sunlight. Accordingly, there also is a need for improved methods and writing instruments for permanently colored reverse photochromic inks. Thus, ultraviolet absorbers for permanently colored reverse photochromic inks, methods of permanently coloring reverse photochromic ink formulations, and writing instruments including ultraviolet absorbers also are provided herein.

As used herein, "permanently colored" is used broadly to indicate that at least a portion of the colored components of an ink formulation remain on the substrate, have not been rendered colorless or transparent, and will not be substantially erased by further exposure to UV light.

As used herein, "ultraviolet absorber" is used broadly to refer to a substance that can undergo light-induced oxidation through free-radical generation when exposed to UV light. For example, ultraviolet absorbers include, but are not limited to, 2-hydroxy-benzophenone ("BP") and its derivatives, oxalanilide ("Ox") and its derivatives, 2-(2-hydroxyphenyl)-benzotriazole ("BTZ") and its dervatives, hydroxyphenyl-s-triazine ("HPT") and its derivatives, and any combination thereof.

Ultraviolet Absorbers for Permanently Colored Reverse Photochromic Inks

Ultraviolet absorbers for permanently colored reverse photochromic inks are disclosed herein. In some embodiments, the ultraviolet absorbers may be provided in the form of an ultraviolet absorbing ink formulation ("UVA ink formulation").

In some embodiments, the UVA ink formulation may consist only of one or more ultraviolet absorbers. For example, in some embodiments, the UVA ink formulation may consist only of 2-hydroxy-benzophenone ("BP") and its derivatives, oxalanilide ("Ox") and its derivatives, 2-(2-hydroxyphenyl)-benzotriazole ("BTZ") and its dervatives, hydroxyphenyl-s-triazine ("HPT") and its derivatives, or combinations thereof, without any additional components. In some embodiments, the UVA ink formulation may consist only of an aqueous UV absorber dispersion based on a red shifted hydroxyphenyl-s-triazine chormophore, such as Tinuvin® 477-DW, commercially available from BASF (Germany).

In some embodiments, the UVA ink formulation contains ultraviolet absorbers in an amount of from about 1 wt. % to about 95 wt. %, for example from about 1 wt. % to about 20 wt. %, from about 1 wt. % to about 10 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, about 95 wt. %, or any ranges therebetween.

In some embodiments, the UVA ink formulation includes a resin. In some embodiments, the resin may include a variety of synthetic resin emulsions, such as aqueous dispersions of polyacrylic acid esters, styrene-acrylate copolymers, polyvinyl acetate, ethylene-vinyl acetate copolymers, ethylene methacrylic acid copolymers, α-olefin-maleic acid copolymers, silicone resins, polyester and polyurethane, water-soluble resins such as polyvinyl alcohols, polyvinyl pyrrolidone and polyvinyl butyral, alkali-soluble resins such as styrene-maleic acid copolymers, ethylene-maleic acid copolymers and styrene-acrylate copolymers, oil-soluble resins such as ketone resins, ketone-formaldehyde resins, amide resins, alkyd resins, rosin-modified resins, rosin-modified phenol resins, phenol resins, xylene resins, polyvinyl pyrrolidone, α- and β-pinene-phenol polycondensation resins, polyvinyl butyral resins and acrylic resins.

In some embodiments, the UVA ink formulation includes the resin in an amount of from about 0.01 wt. % to about 50 wt. %, for example about 0.01 wt. %, about 10 wt. %, about 20 wt. %, about 30 wt. %, about 40 wt. %, or about 50 wt. %.

In some embodiments, the UVA ink formulation includes a solvent. In some embodiments, the solvent is water. In some embodiments, the solvent is one or more alcohols, for example, benzyl alcohol, ethanol, n-propanol, isopropanol, n-butanol, diacetone alcohol, or combinations thereof. In some embodiments, the solvent is a water-soluble organic solvent, for example, ethanol, propanol, butanol, glycerin, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ethers propylene glycol monobutyl ether, ethylene glycol monomethyl ether acetate, sulfolane, 2-pyrrolidone, N-methyl-2-pyrrolidone and the like. In some embodiments, the solvent is an organic solvent, for example, naphtha, VM&P naphtha, refined solvent naphtha, petroleum spirit, xylene, methylisobutyl ketone, or butyl propionate.

In some embodiments, the UVA ink formulation contains the solvent in an amount of from about 0.01 wt. % to about 80 wt. %, for example about 0.01 wt. %, about 10 wt. % solvent, about 20 wt. %, about 30 wt. %, about 40 wt. %, about 50 wt. %, about 60 wt. %, about 70 wt. %, about 80 wt. %, or any ranges therebetween.

In some embodiments, the UVA ink formulation includes one or more shear-thinning imparting agents, for example, nonionic surfactants having a specific HLB value, xanthan gum, welan gum, succinoglycan (organic acid-modified heteroglycan composed of glucose unit and galactose unit, having an average molecular weight of about 100 to 8,000,000), guar gum, locust bean gum, hydroxyethyl cellulose, alkyl alginates, polymers mainly composed of alkyl methacrylate and having a molecular weight of 100,000 to 150,000, glycomannan, hydrocarbons having a gelling ability and extracted from seaweed such as agar or carrageenan, benzylidenesorbitol or derivatives thereof, crosslinking acrylic acid polymers and the like, hydrophobically-modified urethane (HEUR) thickeners, alkalai-swellable emulsion (ASE) thickeners, hydrophobically-modified alkali-swellable emulsion (HASE) thickeners, associative thickeners, and non-associative thickeners are used alone or mixed in combination.

In some embodiments, the UVA ink formulation includes one or more other additives such as pigments, binders, viscosity modifiers, thixotropic agents, preservatives, lubricants, pH adjustors, antiseptics or fungicides, wetting agents, defoamers, dispersants, surfactants, humectants, biocides, and the like.

Methods of Using UVA Inks to Permanently Color Reverse Photochromic Inks

In some embodiments, methods of using UVA inks to permanently color reverse photochromic ink are provided. In some embodiments, the reverse photochromic ink formulation may be any of those described herein. For example, in some embodiments, the reverse photochromic ink formulation may consist only of one or more reverse photochromic colorants. In some embodiments, the reverse photochromic colorants may include a photochromic dye and an activator or bleaching agent which renders the dye colorless upon exposure to UV light.

In some embodiments, a reverse photochromic ink formulation, such as that of any described above is disposed on a surface (e.g., via contacting a writing instrument containing the reverse photochromic ink formulation to the surface such that the reverse photochromic ink is delivered from the instrument to the surface), and then a UVA ink formulation, such as that of any described above is disposed on the surface and on the reverse photochromic ink disposed on the surface (e.g., via contacting a writing instrument containing the UVA ink formulation to the surface such that the UVA ink is delivered from the instrument to the surface containing the reverse photochromic ink). In some embodiments, the surface is paper. In some embodiments, the reverse photochromic ink formulation and the UVA ink formulation are both provided by the same writing instrument. In some embodiments, the reverse photochromic ink formulation and the UVA ink formulation are provided by separate writing instruments.

In some embodiments, the surface is then exposed to light, but the reverse photochromic ink is not erased. In some embodiments, the light is ambient light. In some embodiments, the light is sunlight. In some embodiments, the light is UV light. In some embodiments, the UV light has a wavelength of from about 315 nm to about 400 nm. In some embodiments, the light is provided by a portion of a writing instrument. In some embodiments, the light is provided by a source separate from the writing instrument.

In some embodiments, the reverse photochromic ink formulations may be considered permanently colored when, after being exposed to UV light having a wavelength of from about 100 nm to about 400 nm for 1 hour, the reverse photochromic ink formulation would not be considered erased by an average consumer. Thus, in some embodiments, determining whether a reverse photochromic ink formulation has been erased may involve a qualitative determination.

In some embodiments, the erasure of the reverse photochromic ink formulations described herein may be evaluated using the Likert scale, wherein write test samples may be evaluated before and after attempted erasing on a 5-point scale, as described above.

In some embodiments, the color of a reverse photochromic ink formulation before and after exposure to UV light may be quantitatively evaluated with a color measurement instrument. In some embodiments the color measurement instrument may be a spectrophotometer, while in some embodiments the color measurement instrument may be a spectrodensitometer.

Colorants were added and the inks were mixed for an additional 2 to 5 minutes at 1500 to 2500 rpm with the speed mixer. The compositions of each of the ink formulations which were prepared and tested is shown in Table 1 below:

TABLE 1

| Sample No. | Solvent Type | Solvent Amount (g) | Resin Type | Resin Amount (g) | Colorant Type | Colorant Amount (g) |
|---|---|---|---|---|---|---|
| 1 | Benzyl alcohol | 4.011 | Joncryl ® 67 | 3.051 | CR234-BT2B | 5.058 |
| 2 | Benzyl alcohol | 4.002 | Joncryl ® 67 | 3.008 | CR234-R33 | 7.09 |
| 3 | Benzyl alcohol | 4.020 | Joncryl ® 67 | 3.017 | CR234-V4 | 5.0051 |
| 4 | Benzyl alcohol | 4.0114 | Joncryl ® 67 | 3.0074 | Spectra red | 4.9927 |
| 5 | Benzyl alcohol | 4.009 | Joncryl ® 67 | 3.0057 | CR2340V4 | 4.9994 |
| 6 | Benzyl alcohol | 4.0109 | Joncryl ® 67 | 3.0033 | CR234-BT2B | 5.0186 |
| 7 | water | 1.0138 | none | none | CR234-BT2B | 0.0592 |
| 8 | Ethanol | 1.0058 | none | none | CR234-BT2B | 0.5045 |
| 9 | n-butanol | 0.9996 | none | none | CR234-BT2B | 0.3293 |
| 10 | Diacetone alcohol | 1.0071 | none | none | CR234-BT2B | 0.4758 |
| 11 | Ethanol | 2.2588 | none | none | CR234-R33 | 2.2579 |
| 12 | Ethanol | 2.0059 | none | none | CR234-BT2B | 2.0026 |
| 13 | Ethanol | 3.998 | Joncryl ® 67 | 3.5010 | CR234-BT2B | 5.0015 |
| 14 | Ethanol | 3.0025 | Joncryl ® 682 | 4.5088 | CR234-BT2B | 5.0156 |
| 15 | Ethanol | 4.0 | Joncryl ® 67 | 3.5052 | CR234-R33 | 5.0155 |
| 16 | Ethanol | 3.0094 | Joncryl ® 682 | 4.5096 | CR234-R33 | 5.0136 |
| 17 | Ethanol | 3.972 | Joncryl ® 67 | 3.5071 | CR234-V4 | 5.0004 |
| 18 | Ethanol | 3.014 | Joncryl ® 682 | 4.5055 | CR234-V4 | 5.093 |

In some embodiments, color differences may be identified using the Commission Internationale de l'Eclairage (CIE) L*a*b* coordinates, as described above. In some embodiments, the reverse photochromic ink formulations may be considered permanently colored when write test samples of the reverse photochromic ink covered with the UVA ink on a white substrate before and after exposure to UV light exhibit a ΔL* value of less than about 0.1, including any ranges therebetween.

Writing Instruments

In some embodiments, writing instruments are provided. In some embodiments, the writing instruments include a writing tip portion connected to a light-shielding tubular member or refill, and any of the UVA ink formulations described above. In some embodiments, the writing instrument further includes a second writing tip portion connected to the opposite end of the light-shielding tubular member or to a second refill, and a reverse photochromic ink formulation. In some embodiments, the writing tip portion is a ballpoint or rollerball. In some embodiments, the writing tip portion is a marker or highlighter. In some embodiments, the writing tip portion is a brush tip. In some embodiments, the second writing tip portion is opposite the first writing tip portion. In such embodiments, a UV-erasing portion may be provided at another location on the writing instrument body (e.g., on a side of the body).

EXAMPLES

Embodiments of the present disclosure may be better understood by reference to the following examples.

Example 1: Ink Formulations

Numerous ink formulations were prepared by allowing the resin to soak in the solvent for from 1-72 hours at 60° C. in a closed container until the resin was dissolved in the solvent. The resulting resin solutions were then mixed in a speed mixer at 1500-2500 rpm for from 2 to 5 minutes.

The various weight percentages of colorant, solvent, and resin used in the samples shown in Table 1 are shown in Table 2 below.

TABLE 2

| Sample No. | Wt % colorant | Wt % solvent | Wt % resin |
|---|---|---|---|
| 1 | 42% | 33% | 25% |
| 2 | 50% | 28% | 21% |
| 3 | 42% | 33% | 25% |
| 4 | 42% | 33% | 25% |
| 5 | 42% | 33% | 25% |
| 6 | 42% | 33% | 25% |
| 7 | 6% | 94% | 0% |
| 8 | 33% | 67% | 0% |
| 9 | 25% | 75% | 0% |
| 10 | 32% | 68% | 0% |
| 11 | 50% | 50% | 0% |
| 12 | 50% | 50% | 0% |
| 13 | 40% | 32% | 28% |
| 14 | 40% | 24% | 36% |
| 15 | 40% | 32% | 28% |
| 16 | 40% | 24% | 36% |
| 17 | 40% | 32% | 28% |
| 18 | 40% | 24% | 36% |

Sample 7 shown above, which used water as a solvent, did not function as an ink formulation, because the colorant was insoluble in the remainder of the ink formulation. Without intending to be bound by theory, it is believed that the CR234-BT2B colorant is insoluble in water. However, each of samples 1-6 and 8-18 above performed reasonably well, showing that a wide range of reverse photochromic colorants, solvents, and resins may be used to prepare reverse photochromic ink formulations. For example, as is illustrated by the samples prepared above, reverse photochromic ink formulations may be prepared which include from about 25 wt. % to about 50 wt. % colorant, from about 24 wt. % to about 75 wt. % solvent, and from about 0.01 wt. % to about 36 wt. % resin.

Example 2: Erasing Reverse Photochromic Ink Formulations

Additional ink formulations were prepared to test the erasability of reverse photochromic ink formulations. These test formulations are detailed in Table 3 below:

TABLE 3

| Formulation No. | Solvent Type | Solvent Amount (g) | Resin Type | Resin Amount (g) | Colorant Type | Colorant Amount (g) |
|---|---|---|---|---|---|---|
| 1 | none | none | none | none | CR234-BT2B | 4.5 |
| 2 | none | none | none | none | CR2324-R33x2 | 4.5 |
| 3 | Benzyl alcohol | 4.0 | Joncryl ® 67 | 3.0 | CR234-BT2B | 5.0 |
| 4 | Benzyl alcohol | 4.0 | Joncryl ® 67 | 3.0 | CR2324-R33x2 | 5.0 |
| 5 | Ethanol | 2.25 | none | none | CR234-BT2B | 2.25 |
| 6 | Ethanol | 2.25 | none | none | CR2324-R33x2 | 2.25 |
| 7 | Ethanol | 4.0 | Joncryl ® 67 | 3.5 | CR234-BT2B | 5.0 |
| 8 | Ethanol | 4.0 | Joncryl ® 67 | 3.5 | CR2324-R33x2 | 5.0 |
| 9 | Ethanol | 3.0 | Joncryl ® 682 | 4.5 | CR234-BT2B | 5.0 |
| 10 | Ethanol | 3.0 | Joncryl ® 682 | 4.5 | CR2324-R33x2 | 5.0 |

Samples of each of the ink formulations listed above were prepared and loaded into separate writing instruments. Formulations 5 and 6 were prepared by weighing the components in a vial and mixing on a speed mixer for 2 to 5 minutes at 1500 to 2500 rpm. Formulations 1 and 2 were placed directly into writing instruments. Formulations 3, 4, and 7-10 were prepared by allowing the resin to soak in the solvent for from 1-72 hours at 60° C. in a closed container until the resin was dissolved in the solvent. The resulting resin solutions were then mixed in a speed mixer at 1500-2500 rpm for from 2 to 5 minutes. Colorants were added and the inks were mixed for an additional 2 to 5 minutes at 1500 to 2500 rpm with the speed mixer.

Write traces were then generated on a Hutt write test machine according to ISO 14145-1:2016 on ISO 14145 paper using 100 gram-force (gf). The write test speeds and pitches were varied to optimize the appearance of the inks. Next, small samples of each the write traces were cut out, and the L*, a*, and b* values of the write traces were taken using a 16 mm aperture spectrodensitometer. Each sample was exposed to UV light for 60 seconds at various time intervals as described below, and the L*, a*, and b* values of the write traces after UV light exposure were taken using a 16 mm aperture spectrodensitometer.

Two different UV light sources were used in the tests described below—a 340 nm LED UV head manufactured by Clearstone Technologies Inc., and a battery-powered 365 nm UV flashlight. The flashlight exhibited a fairly steady decrease in irradiance over time, as the batteries were consumed, while the 340 nm LED UV head, which was not battery-powered, exhibited a constant irradiance. The exposures occurred at up to three different time intervals after each of the write traces was generated—less than about 30 minutes, about 5 hours, and about 24 hours. Through these three time intervals, the change in the ability to erase the reverse photochromic colorants was investigated.

Formulations 1, 2, 5, and 6

First, formulation nos. 1 and 2, which were "neat" samples of CR234-BT2B and CR2324-R33x2, respectively, were prepared and loaded into Sharpie® Ultrafine components. Next, formulation nos. 5 and 6 were prepared and loaded into Sharpie® Ultrafine components. Due to the relatively low viscosities of each of these formulations, each could successfully be loaded into a Sharpie® pen alone and write successfully.

A cutout of the write trace made using formulation 1 is shown in FIG. 1 as 101. A cutout of the write trace made using formulation 5 is shown in FIG. 1 as 103. As can be seen by comparing 103 and 101, the write trace made using formulation 5 was much darker than the write trace made using formulation 1. While not intending to be bound by a particular theory, it is believed that the ethanol solvent used in formulation 5 lowered the viscosity of the ink formulation compared to formulation 1, thereby increasing the flowrate of ink. Cutouts of the write traces made using formulations 1 and 5 were then each subjected to 340 nm UV light having an irradiance of 19.7 mW/cm$^2$ 13 minutes after they were first created. Cutouts of these samples after UV light irradiation are shown in FIG. 1 as 105 and 107, respectively. As can be seen by visually comparing cutouts 101 and 103 with irradiated cutouts 105 and 107, the ink was substantially erased to the naked eye with the UV treatment. Next, cutouts of the write traces made using formulations 1 and 5 were then each subjected to 340 nm UV light having an irradiance of 19.7 mW/cm$^2$ 244 minutes and 225 minutes after they were first created, respectively. Cutouts of these samples after UV light irradiation are shown in FIG. 1 as 109 and 111, respectively. As can be seen by visually comparing cutouts 101 and 103 with irradiated cutouts 105 and 107, and with irradiated cutouts 109 and 111, the reverse photochromic ink formulations erased reasonably well even after a prolonged period left on the paper.

Figure 2:
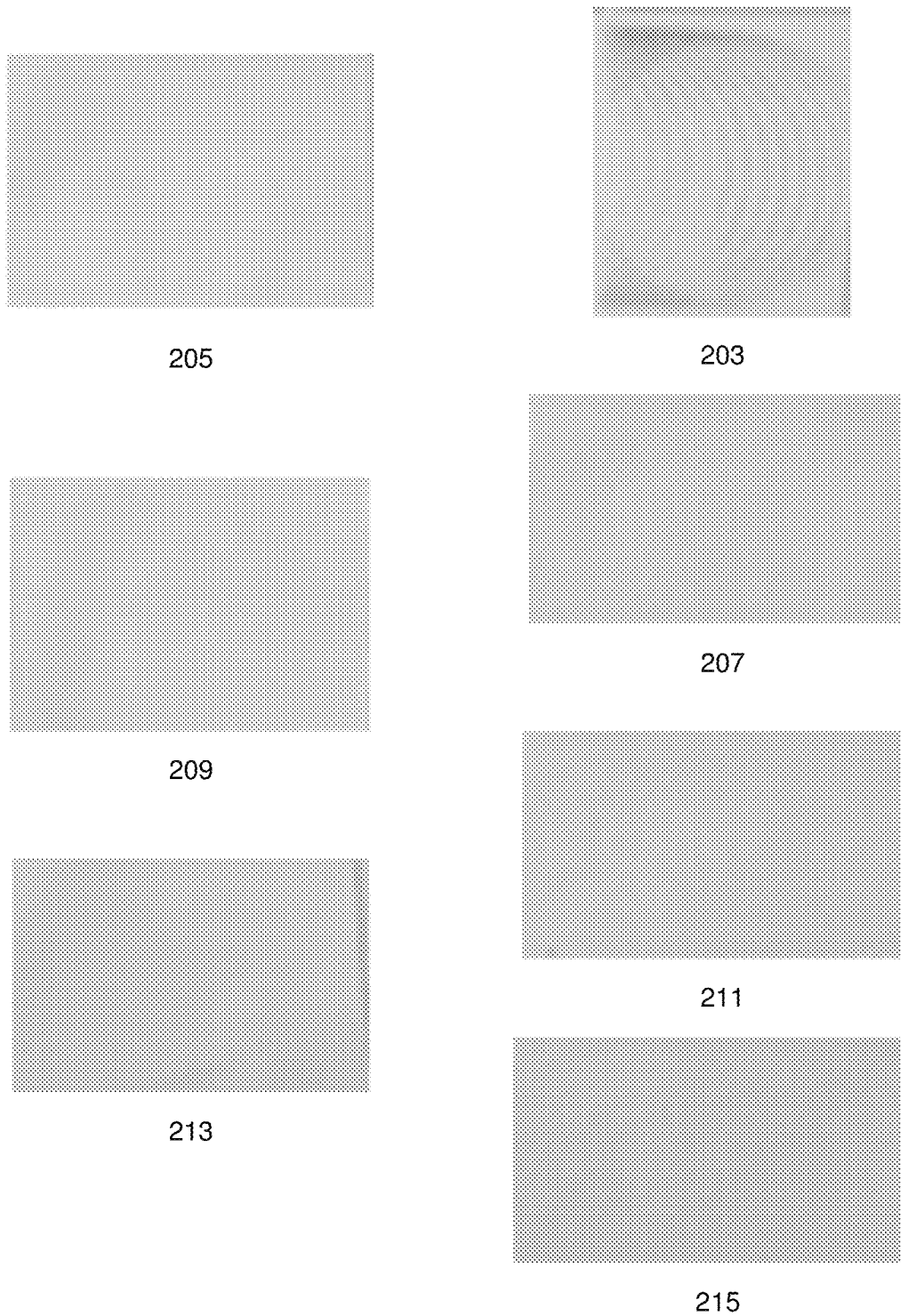
FIG. 2 is a series of photographs of write test samples made using the reverse photochromic ink formulations tested in FIG. 1, before and after exposure to UV light.

Additional cutouts of these write traces were prepared and tested, as shown in FIG. 2. A cutout of the write trace made using formulation 5 is shown in FIG. 2 as 203. Cutouts of the write traces made using formulations 1 and 5 were then each subjected to 340 nm UV light having an irradiance of 19.7 mW/cm$^2$ 23 minutes and 16 minutes after they were first created, respectively. Cutouts of these samples after UV light irradiation are shown in FIG. 2 as 205 and 207, respectively. As can be seen by visually comparing cutouts 101 and 203 with irradiated cutouts 205 and 207, the ink was substantially erased with the UV treatment. Next, cutouts of the write traces made using formulations 1 and 5 were each subjected to 340 nm UV light having an irradiance of 19.7 mW/cm$^2$ 346 minutes and 325 minutes after they were first created, respectively. Cutouts of these samples after UV light irradiation are shown in FIG. 2 as 209 and 211, respectively.

As can be seen by visually comparing cutouts 101 and 203 with irradiated cutouts 205 and 207, and with irradiated cutouts 209 and 211, the reverse photochromic ink formulations erased substantially to the naked eye well even after a prolonged period left on the paper. Finally, cutouts of the write traces made using formulations 1 and 5 were each subjected to 340 nm UV light having an irradiance of 19.7 mW/cm² 1458 minutes and 1479 minutes after they were first created, respectively. Cutouts of these samples after UV light irradiation are shown in FIG. 2 as 213 and 215, respectively. As can be seen by visually comparing cutouts 101 and 203 with irradiated cutouts 205 and 207, with irradiated cutouts 209 and 211, and with irradiated cutouts 213 and 215, the reverse photochromic ink formulations erased reasonably well even after a prolonged period left on the paper.

A cutout of the write trace made using formulation 2 is shown in FIG. 3 as 301. A cutout of the write trace made using formulation 6 is shown in FIG. 3 as 303. As can be seen by comparing 303 and 301, the write trace made using formulation 6 was much darker than the write trace made using formulation 2. While not intending to be bound by a particular theory, it is believed that the ethanol solvent used in formulation 6 lowered the viscosity of the ink formulation compared to formulation 2, thereby increasing the flowrate of ink. Cutouts of the write traces made using formulations 2 and 6 were then each subjected to 340 nm UV light having an irradiance of 19.7 mW/cm² 11 minutes after they were first created. Cutouts of these samples after UV light irradiation are shown in FIG. 3 as 305 and 307, respectively.

As can be seen by visually comparing cutouts 301 and 303 with irradiated cutouts 305 and 307, the ink was slightly erased with the UV treatment, but substantial color remained. Next, cutouts of the write traces made using formulations 2 and 6 were then each subjected to 340 nm UV light having an irradiance of 19.7 mW/cm² 235 minutes and 221 minutes after they were first created, respectively. Cutouts of these samples after UV light irradiation are shown in FIG. 3 as 309 and 311, respectively. As can be seen by visually comparing cutouts 301 and 303 with irradiated cutouts 305 and 307, and with irradiated cutouts 309 and 311, the reverse photochromic ink formulations erased reasonably well even after a prolonged period left on the paper.

Additional cutouts of these write traces were prepared and tested, as shown in FIG. 4. A cutout of the write trace made using formulation 2 is shown in FIG. 4 as 401. A cutout of the write trace made using formulation 6 is shown in FIG. 4 as 403. Cutouts of the write traces made using formulations 2 and 6 were then each subjected to 340 nm UV light having an irradiance of 19.7 mW/cm² 14 minutes after they were first created, respectively. Cutouts of these samples after UV light irradiation are shown in FIG. 4 as 405 and 407, respectively.

As can be seen by visually comparing cutouts 401 and 403 with irradiated cutouts 405 and 407, the ink was relatively well erased with the UV treatment. Next, cutouts of the write traces made using formulations 2 and 6 were each subjected to 340 nm UV light having an irradiance of 19.7 mW/cm² 334 minutes and 321 minutes after they were first created, respectively. Cutouts of these samples after UV light irradiation are shown in FIG. 4 as 409 and 411, respectively. As can be seen by visually comparing cutouts 401 and 403 with irradiated cutouts 405 and 407, and with irradiated cutouts 409 and 411, the reverse photochromic ink formulations erased better after a shorter time interval (as shown in 405 and 407) than after the relatively longer time interval (as shown in 409 and 411). Finally, cutouts of the write traces made using formulations 2 and 6 were each subjected to 340 nm UV light having an irradiance of 19.7 mW/cm² 1457 minutes and 1466 minutes after they were first created, respectively. Cutouts of these samples after UV light irradiation are shown in FIG. 4 as 413 and 415, respectively. As can be seen by visually comparing cutouts 401 and 403 with irradiated cutouts 405 and 407, with irradiated cutouts 409 and 411, and with irradiated cutouts 413 and 415, the reverse photochromic ink formulations erased better after a shorter time interval (as shown in 409 and 411) than after the relatively longer time interval (as shown in 413 and 415).

Formulations 3 & 4

Next, samples of formulation 3 were loaded into ballpen refills using the IWI point 2600/NW/10/TC/AW26 and write traces were prepared. A first cutout of the write trace made using formulation 3 is shown in FIG. 5 as 501. A second cutout of the write trace made using formulation 3 is shown in FIG. 5 as 503. Cutouts of the write traces made using formulation 3 were then each subjected to 340 nm UV light having an irradiance of 19.7 mW/cm² 15 minutes and 12 minutes after they were first created, respectively. Cutouts of these samples after UV light irradiation are shown in FIG. 5 as 505 and 507, respectively.

As can be seen by visually comparing cutouts 501 and 503 with irradiated cutouts 505 and 507, the ink was substantially erased to the naked eye with the UV treatment. Next, cutouts of the write traces made using formulation 3 were each subjected to 365 nm UV light having an irradiance of 14-16 mW/cm² 30 minutes and 25 minutes after they were first created, respectively. Cutouts of these samples after UV light irradiation are shown in FIG. 5 as 509 and 511, respectively, where the black circles outline the irradiated area. As can be seen by visually comparing cutouts 501 and 503 with irradiated cutouts 509 and 511, the ink was substantially erased to the naked eye with the UV treatment in the treated area.

Next, cutouts of the write traces made using formulation 3 were each subjected to 340 nm UV light having an irradiance of 19.7 mW/cm² 80 minutes and 60 minutes after they were first created, respectively. Cutouts of these samples after UV light irradiation are shown in FIG. 5 as 513 and 515, respectively. As can be seen by visually comparing cutouts 501 and 503 with irradiated cutouts 505 and 507, and with irradiated cutouts 513 and 515, formulation 3 erased better after a shorter time interval (as shown in 505 and 507) than after the relatively longer time interval (as shown in 513 and 515). Finally, cutouts of the write traces made using formulation 3 were each subjected to 365 nm UV light having an irradiance of 12-14 mW/cm² 95 minutes and 75 minutes after they were first created, respectively. Cutouts of these samples after UV light irradiation are shown in FIG. 5 as 517 and 519, respectively, where the black circles outline the irradiated area. As can be seen by visually comparing cutouts 501 and 503 with irradiated cutouts 509 and 511, with irradiated cutouts 517 and 519 formulation 3 erased better after a shorter time interval (as shown in 509 and 511) than after the relatively longer time interval (as shown in 517 and 519).

Figure 6:
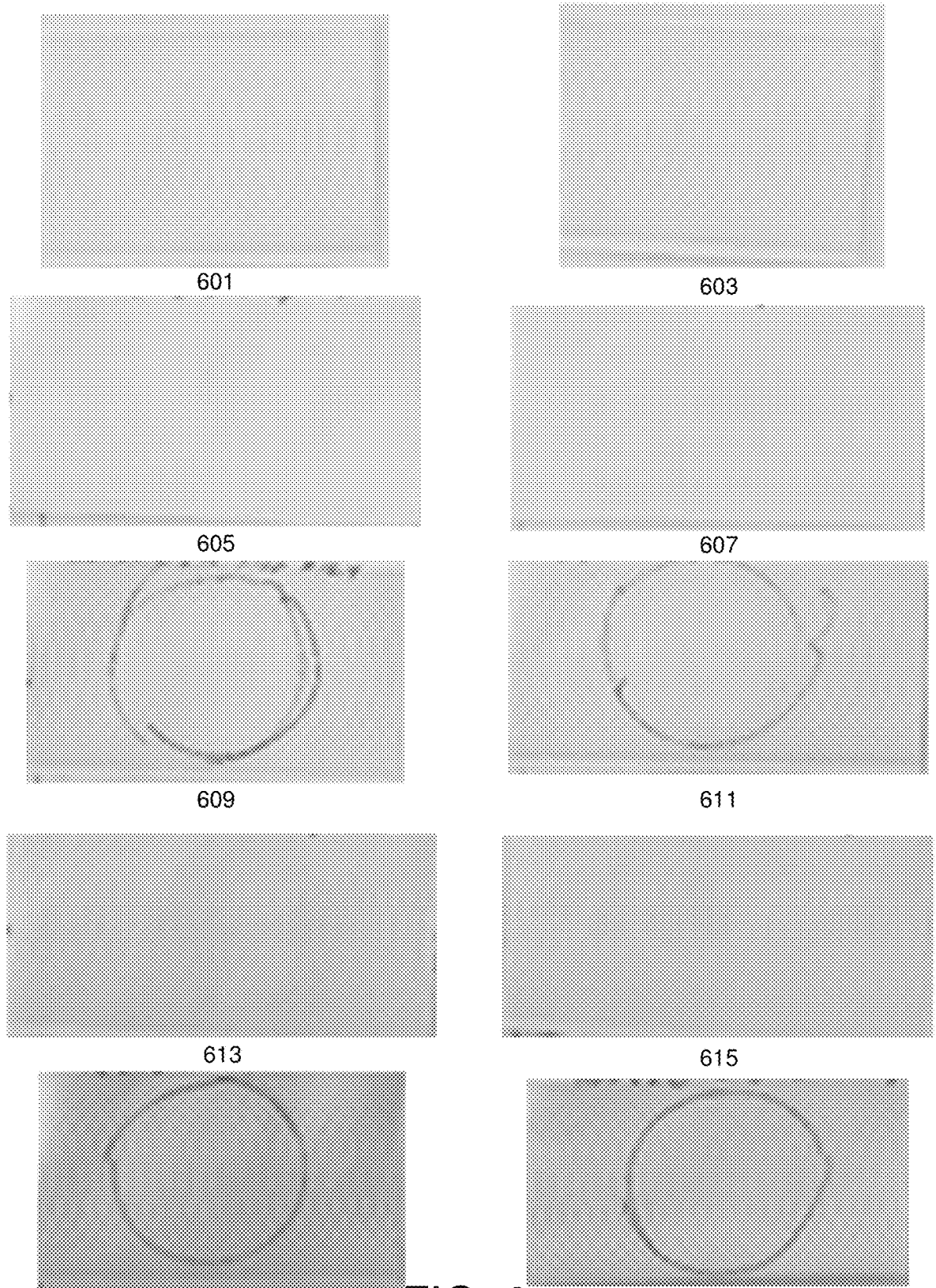
FIG. 6 is a series of photographs of write test samples made using an embodiment of a reverse photochromic ink formulation, before and after exposure to UV light from two sources.

Next, samples of formulation 4 were loaded into ballpen refills using the IWI point 2600/NW/10/TC/AW26, write traces were prepared, and L*, a*, and b* values recorded as described above for samples of formulation 3. A first cutout of the write trace made using formulation 4 is shown in FIG. 6 as 601. A second cutout of the write trace made using formulation 3 is shown in FIG. 6 as 603. Cutouts of the write traces made using formulation 4 were then each subjected to 340 nm UV light having an irradiance of 19.7 mW/cm² 15 minutes and 10 minutes after they were first created, respectively. Cutouts of these samples after UV light irradiation are shown in FIG. 6 as 605 and 607, respectively.

As can be seen by visually comparing cutouts 601 and 603 with irradiated cutouts 605 and 607, the ink was relatively well erased to the naked eye with the UV treatment, but erased less with the UV treatment than the inks made using formulation 3 as shown in FIG. 5. Next, Cutouts of the write traces made using formulation 4 were each subjected to 365 nm UV light having an irradiance of 14-16 mW/cm$^2$ 30 minutes and 20 minutes after they were first created, respectively. Cutouts of these samples after UV light irradiation are shown in FIG. 6 as 609 and 611, respectively, where the black circles outline the irradiated area. As can be seen by visually comparing cutouts 601 and 603 with irradiated cutouts 609 and 611, the ink was relatively well erased with the UV treatment in the treated area, although it was less well erased than the inks of formulation 3.

Next, cutouts of the write traces made using formulation 4 were each subjected to 340 nm UV light having an irradiance of 19.7 mW/cm$^2$ 80 minutes and 65 minutes after they were first created, respectively. Cutouts of these samples after UV light irradiation are shown in FIG. 6 as 613 and 615, respectively. As can be seen by visually comparing cutouts 601 and 603 with irradiated cutouts 605 and 607, and with irradiated cutouts 613 and 615, formulation 4 erased better after a shorter time interval (as shown in 605 and 607) than after the relatively longer time interval (as shown in 613 and 615). Finally, cutouts of the write traces made using formulation 3 were each subjected to 365 nm UV light having an irradiance of 12-14 mW/cm$^2$ 95 minutes and 75 minutes after they were first created, respectively. Cutouts of these samples after UV light irradiation are shown in FIG. 6 as 617 and 619, respectively, where the black circles outline the irradiated area. As can be seen by visually comparing cutouts 601 and 603 with irradiated cutouts 609 and 611 and with irradiated cutouts 617 and 619, formulation 4 erased better after a shorter time interval (as shown in 609 and 611) than after the relatively longer time interval (as shown in 617 and 619).

Formulations 7-10

Samples of formulation nos. 7-10 were loaded into ball-pen refills using the IWI point 2600/NW/10/TC/AW26 and write traces were prepared and tested as described above.

Figure 7:
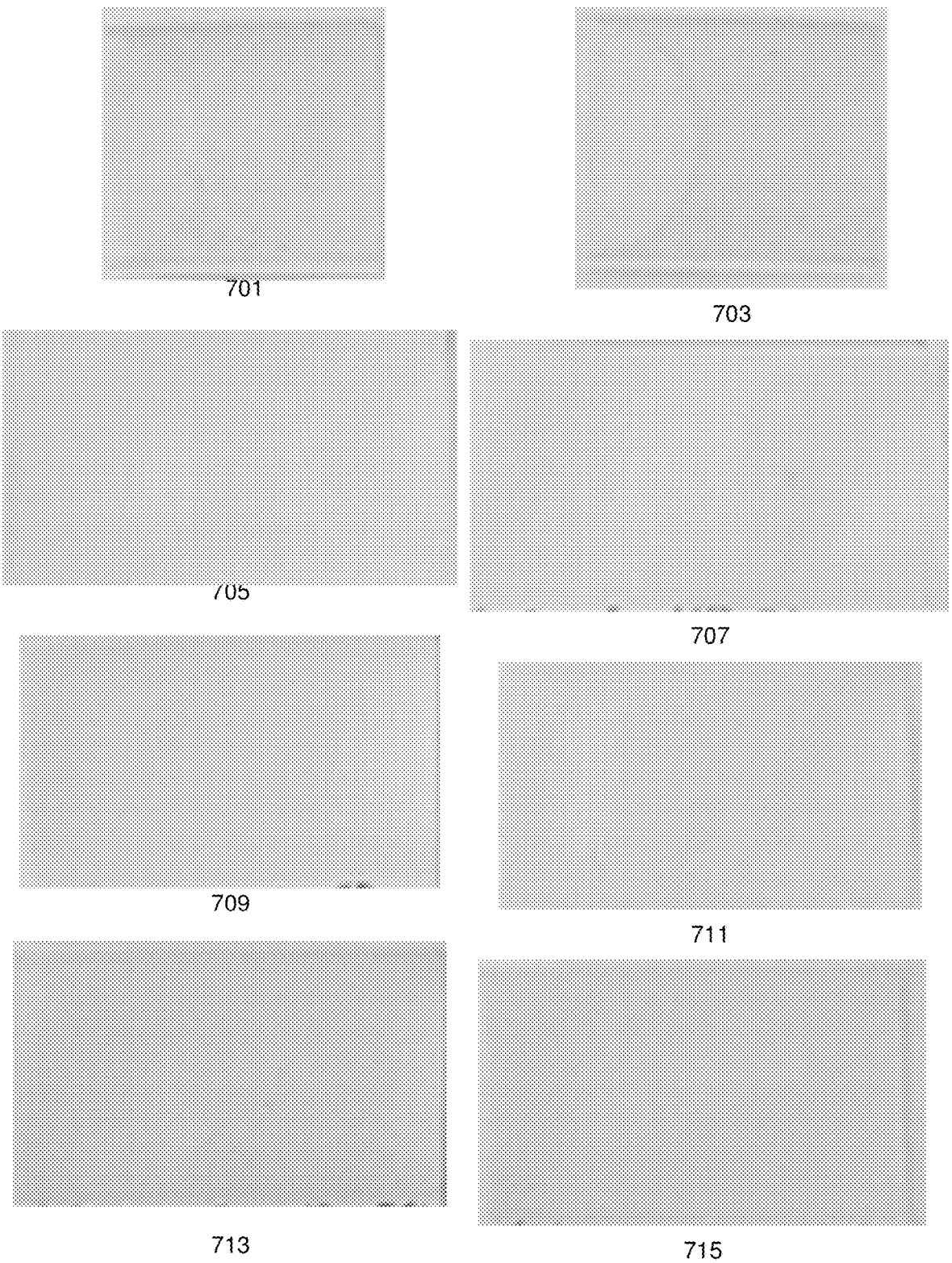
FIG. 7 is a series of photographs of write test samples made using two embodiments of a reverse photochromic ink formulation, before and after exposure to UV light.

Cutouts of the write traces prepared using formulation nos. 7 and 9 are shown in FIG. 7. A cutout of the write trace made using formulation 7 is shown in FIG. 7 as 701. A cutout of the write trace made using formulation 9 is shown in FIG. 7 as 703. Cutouts of the write traces made using formulations 7 and 9 were then each subjected to 340 nm UV light having an irradiance of 19.7 mW/cm$^2$ 14 minutes and 12 minutes after they were first created, respectively. Cutouts of these samples after UV light irradiation are shown in FIG. 7 as 705 and 707, respectively.

As can be seen by visually comparing cutouts 701 and 703 with irradiated cutouts 705 and 707, the ink was relatively erased with the UV treatment, although it was not as well erased as ink formulations that did not contain a resin, such as formulations 1 and 5. Next, cutouts of the write traces made using formulations 7 and 9 were each subjected to 340 nm UV light having an irradiance of 19.7 mW/cm$^2$ 304 minutes and 297 minutes after they were first created, respectively. Cutouts of these samples after UV light irradiation are shown in FIG. 7 as 709 and 711, respectively. As can be seen by visually comparing cutouts 701 and 703 with irradiated cutouts 705 and 707, and with irradiated cutouts 709 and 711, the reverse photochromic ink formulations erased better after a short amount of time on the paper (as shown in 705 and 707) than after a longer amount of time on the paper (as shown in 709 and 711). Finally, cutouts of the write traces made using formulations 7 and 9 were each subjected to 340 nm UV light having an irradiance of 19.7 mW/cm$^2$ 1458 minutes and 1449 minutes after they were first created, respectively. Cutouts of these samples after UV light irradiation are shown in FIG. 7 as 713 and 715, respectively. As can be seen by visually comparing cutouts 701 and 703 with irradiated cutouts 705 and 707, with irradiated cutouts 709 and 711, and with irradiated cutouts 713 and 715, the reverse photochromic ink formulations erased much better after a short amount of time on the paper (as shown in 705 and 707) than after a prolonged amount of time on the paper (as shown in 713 and 715).

Cutouts of the write traces prepared using formulations 8 and 10 are shown in FIG. 8. A cutout of the write trace made using formulation 8 is shown in FIG. 8 as 801. A cutout of the write trace made using formulation 10 is shown in FIG. 8 as 803. Cutouts of the write traces made using formulations 8 and 10 were then each subjected to 340 nm UV light having an irradiance of 19.7 mW/cm$^2$ 13 minutes and 14 minutes after they were first created, respectively. Cutouts of these samples after UV light irradiation are shown in FIG. 8 as 805 and 807, respectively.

As can be seen by visually comparing cutouts 801 and 803 with irradiated cutouts 805 and 807, the ink was relatively well erased with the UV treatment, although it was not as well erased as ink formulations that did not contain a resin, such as formulation nos. 2 and 6. Next, cutouts of the write traces made using formulations 8 and 10 were each subjected to 340 nm UV light having an irradiance of 19.7 mW/cm$^2$ 307 minutes and 295 minutes after they were first created, respectively. Cutouts of these samples after UV light irradiation are shown in FIG. 8 as 809 and 811, respectively. As can be seen by visually comparing cutouts 801 and 803 with irradiated cutouts 805 and 807, and with irradiated cutouts 809 and 811, the reverse photochromic ink formulations erased better after a short amount of time on the paper (as shown in 805 and 807) than after a longer amount of time on the paper (as shown in 809 and 811). Finally, cutouts of the write traces made using formulations 8 and 10 were each subjected to 340 nm UV light having an irradiance of 19.7 mW/cm$^2$ 1450 minutes and 1438 minutes after they were first created, respectively. Cutouts of these samples after UV light irradiation are shown in FIG. 8 as 813 and 815, respectively. As can be seen by visually comparing cutouts 801 and 803 with irradiated cutouts 805 and 807, with irradiated cutouts 809 and 811, and with irradiated cutouts 813 and 815, the reverse photochromic ink formulations erased much better after a short amount of time on the paper (as shown in 805 and 807) than after a prolonged amount of time on the paper (as shown in 813 and 815).

Figure 9:
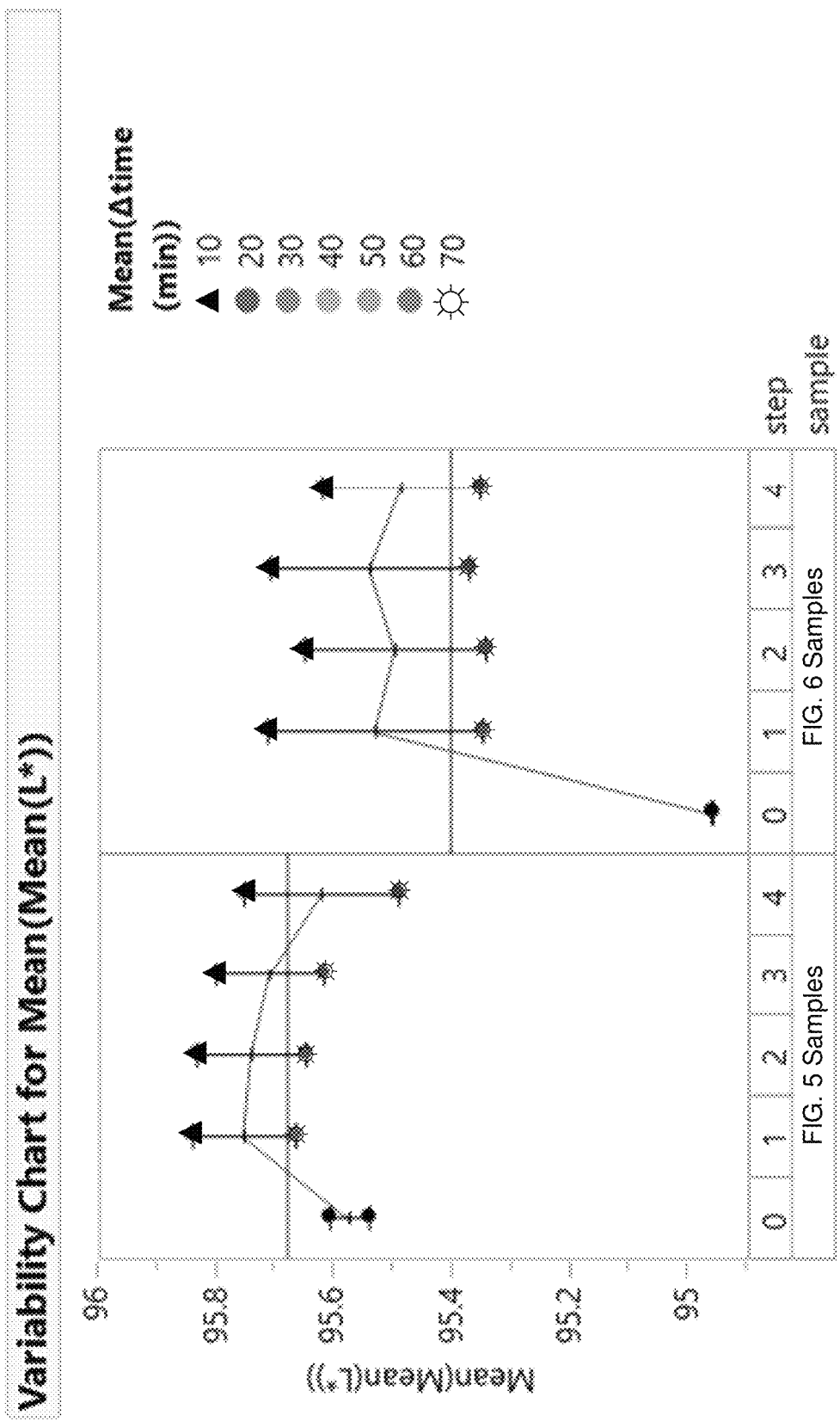
FIG. 9 is a correlation graph of the measured L* values of the write test samples shown in FIG. 5 and FIG. 6.
Figure 10:
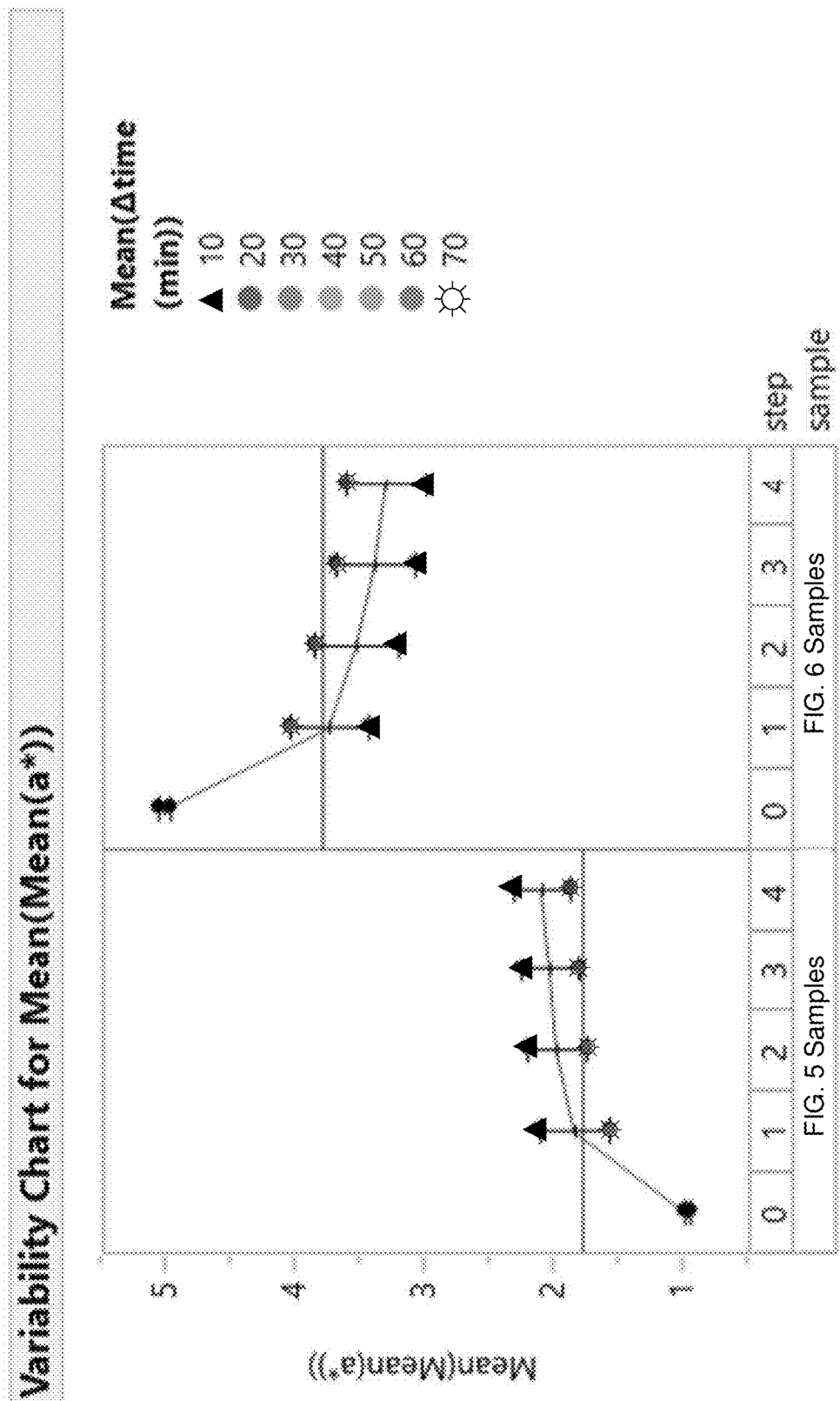
FIG. 10 is a correlation graph of the measured a* values of the write test samples shown in FIG. 5 and FIG. 6.
Figure 11:
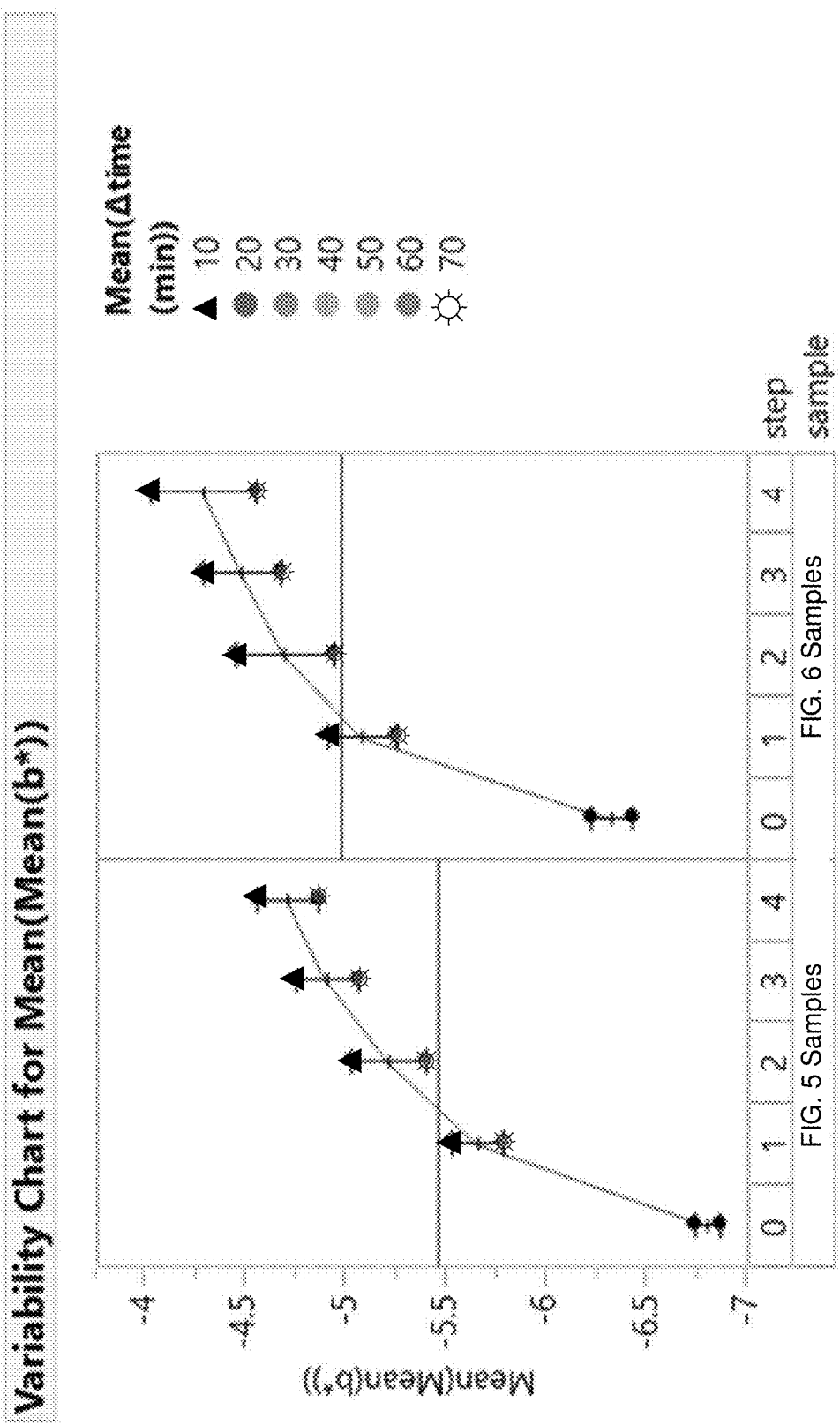
FIG. 11 is a correlation graph of the measured b* values of the write test samples shown in FIG. 5 and FIG. 6.

Example 3: Quantitative Analysis of Erasability of Reverse Photochromic Ink Formulations As described above, the L*, a*, and b* of each sample of formulation 3 (blue ink) and formulation 4 (red ink) before and after each UV light exposure were measured. The average L* values of these samples are shown in FIG. 9, the average a* values of these samples are shown in FIG. 10, and the average b* values of these samples are shown in FIG. 11. Each of FIGS. 9, 10, and 11 shows two graphs—a left graph which illustrates the measured L*, a*, and b* values of the samples shown in FIG. 5, and a right graph which shows the measured L*, a*, and b* values of the samples shown in FIG. 6. Each of FIGS. 9, 10, and 11 has a horizontal axis which shows 5 different numbered steps, where step 0 corresponds to the initial time (before any UV exposure), step 1 corresponds to the first time interval (the shortest time interval), and steps 2-4 correspond to progressively increasing time intervals. For example, in FIG. 9, the measured L* values of 501 and 503 are included in step 0 of the left graph, while the measured L* values of 517 and 519 are included in step 4 of the left graph. Each of FIGS. 9, 10, and 11 shows a vertical axis which corresponds to the average measured L*, a*, and b* values, respectively, with vertical bars surrounding each data point showing the variance in measured L*, a*, and b* based on the elapsed time from making the write sample, and with a line connecting each measured data point. The blue data points (represented by triangles) on each of these graphs exhibit larger color loss due to the shorter elapsed time between creating the write trace and applying the UV light, while the red points (represented by sun symbols) exhibit less color loss due to the longer elapsed time between creating the write trace and applying the UV light.

As can be seen from FIG. 9, the measured L* values for formulation 3 on the left graph and formulation 4 on the right graph did not exhibit much variation. This indicates that the overall lightness/darkness of the samples did not change significantly, likely because the initial samples produced from formulations 3 and 4 were very light, as can be seen in FIGS. 5 and 6. However, the measured L* values in FIG. 9 confirm that the samples became lighter after UV exposure, for each sample time. Similarly, the L* values of FIG. 9 confirm that the greatest change in L* values occurred with the first exposure to UV light. In other words, the erasability of ink formulations 3 and 4 seems to decrease as the time the ink is left on the substrate increases.

As can be seen from FIG. 10, the a* values for the samples made with formulation 3 (shown on the left graph) exhibit a slight increase with UV exposure, while the a* values for the samples made with formulation 4 (shown on the right graph) exhibit a slight decrease with UV exposure. This is consistent with a decrease in blue color in the formulation 3 samples when exposed to UV light, and a decrease in red color in the formulation 4 samples when exposed to UV light. Because formulation 3 was a blue ink and formulation 4 was a red ink, this change in a* values is consistent with an erasure of these inks when exposed to UV light.

As can be seen from FIG. 11, the b* values for the samples made with formulation 3 (shown on the left graph) and for samples made with formulation 4 (shown on the right graph) exhibit increase with UV exposure, so that the measured b* values of these samples moved toward a zero value with UV exposure. This is consistent with an elimination of the overall color present in these samples.

Figure 12:
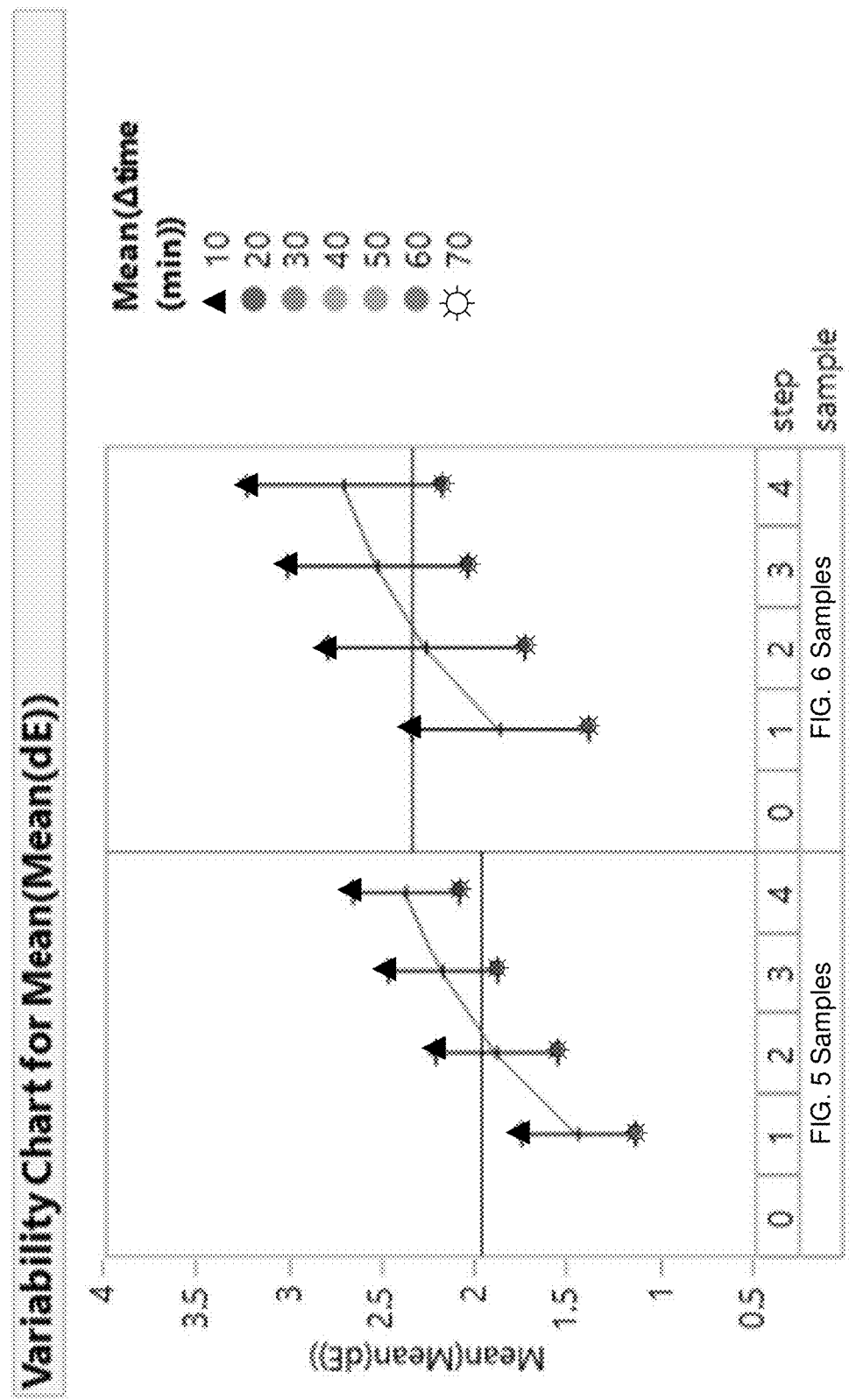
FIG. 12 is a correlation graph of the ΔE* values calculated from the measured L*, a*, and b* values shown in FIGS. 9-11.

Next, the ΔE* values after each UV exposure step were calculated and are shown in FIG. 12, with the ΔE* values of formulation 3 being shown on the left graph and the ΔE* values of formulation 4 being shown on the right graph. The vertical lines in each of the graphs of FIG. 12 show the variance in ΔE* values based on the elapsed time elapsed time from making the write sample, and with a line connecting each average ΔE* value. The blue data points (represented by triangles) on each of these graphs exhibit larger color loss due to the shorter elapsed time between creating the write trace and applying the UV light, while the red points (represented by sun symbols) exhibit less color loss due to the longer elapsed time between creating the write trace and applying the UV light. These ΔE* values confirm that the ability to eliminate the color in the reverse photochromic ink formulations with UV light decreases based on the time which elapses between when the ink is applied to the substrate and when it is exposed to UV light.

Figure 13:
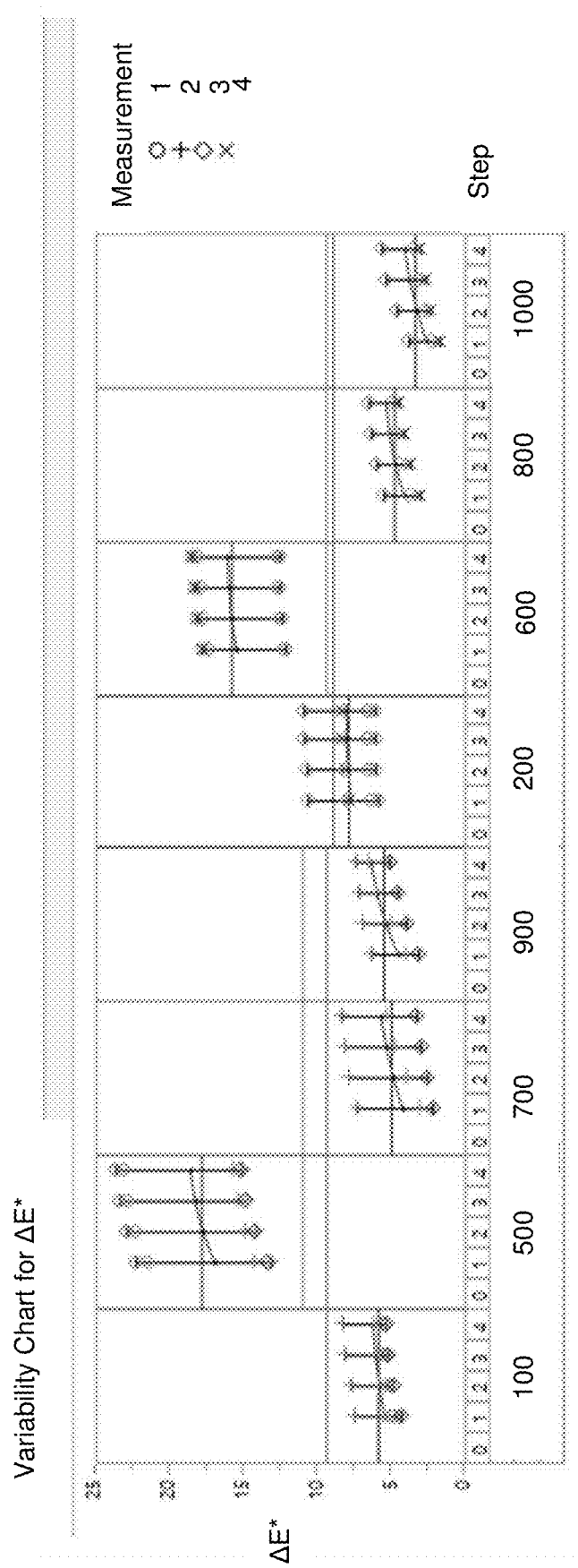
FIG. 13 is a correlation graph of the ΔE* values calculated from the measured L*, a*, and b* values of the write test samples shown in FIGS. 1-8.

Similarly, L* a* and b* values were measured for the samples made with ink formulations 1, 2, and 5-10, and ΔE* values were calculated from these L*, a*, and b* values. These ΔE* values are shown in FIG. 13. FIG. 13 shows ΔE* values on the vertical axis and step numbers 0-4 on the horizontal axis. As above, step 0 corresponds to the sample before exposure to UV light, and thus has no ΔE* value. Step 1 corresponds to the measurement made after the first exposure to UV light at the shortest time interval after creation, and step 4 corresponds to the measurement made after the exposure to UV light the longest time interval after creation. Graph 100 shows the ΔE* values calculated from the measured samples made using formulation 1. Graph 200 shows the ΔE* values calculated from the measured samples made using formulation 2. Graph 500 shows the ΔE* values calculated from the measured samples made using formulation 5. Graph 600 shows the ΔE* values calculated from the measured samples made using formulation 6. Graph 700 shows the ΔE* values calculated from the measured samples made using formulation 7. Graph 800 shows the ΔE* values calculated from the measured samples made using formulation 8. Graph 900 shows the ΔE* values calculated from the measured samples made using formulation 9. Graph 1000 shows the ΔE* values calculated from the measured samples made using formulation 10.

As can be seen from the ΔE* values of FIG. 13, each of these ink formulations became less erasable the more time that the ink was allowed to remain on the substrate before being treated with UV light. The ΔE* values measured after short periods of time between creation of the write traces and UV light exposure are shown in green, while the ΔE* values measured after longer periods of time between creation of the write traces and UV light exposure are shown in red. The ΔE* values are shown in FIG. 13 also show a relatively wide variation, corresponding to the heaviness of the laydown on the samples. For example, the samples made using formulation 5 had a relatively heavy, dark, laydown, and have correspondingly large ΔE* values. While not intending to be bound by a particular theory, it is believed that the resins used in certain ink formulations may interfere with the functioning of the reverse photochromic colorants, reducing the erasability of these reverse photochromic ink formulations.

Example 4: Additional Reverse Photochromic Inks

Several additional reverse photochromic ink formulations were prepared by adding about 3 grams of Joncryl® 67 resin to about 4 grams of benzyl alcohol and heating and mixing until the Joncryl® 67 was dissolved. Colorants were then added to this solution in 1 to 1.5 gram increments until a color intensity was achieved that rendered the laydown of the reverse photochromic inks visible on paper. The reverse photochromic ink formulations which were prepared and tested for lightfastness are shown in Table 4 below:

TABLE 4

| Formulation No. | Amount of Benzyl Alcohol (g) | Resin Type | Amount of Joncryl® 67 (g) | Colorant Type | Colorant Amount (g) |
| --- | --- | --- | --- | --- | --- |
| 11 | 4.011 | Joncryl® 67 | 3.051 | CR234-BT2B | 5.058 |

TABLE 4-continued

| Formulation No. | Amount of Benzyl Alcohol (g) | Resin Type | Amount of Joncryl ® 67 (g) | Colorant Type | Colorant Amount (g) |
|---|---|---|---|---|---|
| 12 | 4.002 | Joncryl ® 67 | 3.008 | CR234-R33 | 7.09 |
| 13 | 4.020 | Joncryl ® 67 | 3.017 | CR234-V4 | 5.0051 |

The various weight percentages of colorant, solvent, and resin used in the samples shown in Table 4 are shown in Table 5 below.

TABLE 5

| Sample No. | Wt % colorant | Wt % solvent | Wt % resin |
|---|---|---|---|
| 11 | 42% | 33% | 25% |
| 12 | 50% | 28% | 21% |
| 13 | 42% | 33% | 25% |

Example 5: Lightfastness of Reverse Photochromic Inks

Samples of each of ink formulations 11-13 were loaded into ballpoint refill tubes and 2600/NS/10/TC/AW26 ballpen points were attached. Write traces were then generated on a Hutt write test machine according to ISO 14145-1:2016 on ISO 12757 paper using 100 gram-force (gf) for a length of 25 meters. The write test speeds and pitches were varied to optimize the appearance of the reverse photochromic inks. A cutout of these write trace is shown in FIG. 16, where the write trace made using formulation 11 is shown as 1101, the write trace made using formulation 12 is shown as 1102, and the write trace made using formulation 13 is shown as 1103.

Next, cutouts of the write traces were placed in a UV chamber that emitted UV light having a wavelength of from 300 nm to 800 nm and an irradiance of from 650 W/m² to 750 W/m² for increments of five minutes. After the first interval, formulations 11 and 12 were completely erased. However, some residual violent color remained from the write trace made using formulation 3 even after 25 minutes. A cutout of the write traces after 25 minutes in the UV chamber is shown in FIG. 17, where the completely erased write trace made using formulation 11 is shown as 1201, the completely erased write trace made using formulation 12 is shown as 1202, and the partially erased write trace made using formulation 13 is shown as 1203.

Figure 16:
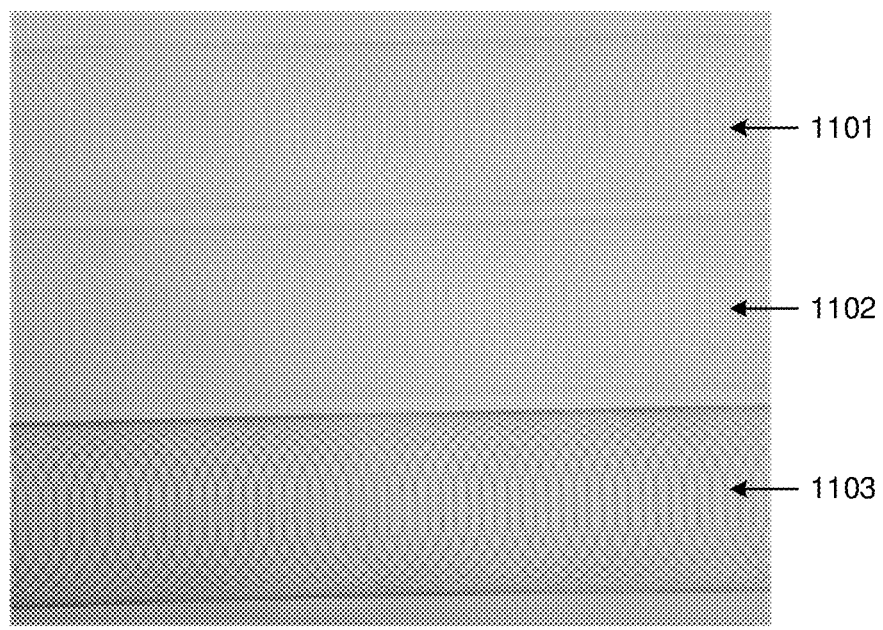
FIG. 16 is a photograph of write test samples made using three embodiments of a reverse photochromic ink formulation before exposure to UV light.
Figure 17:
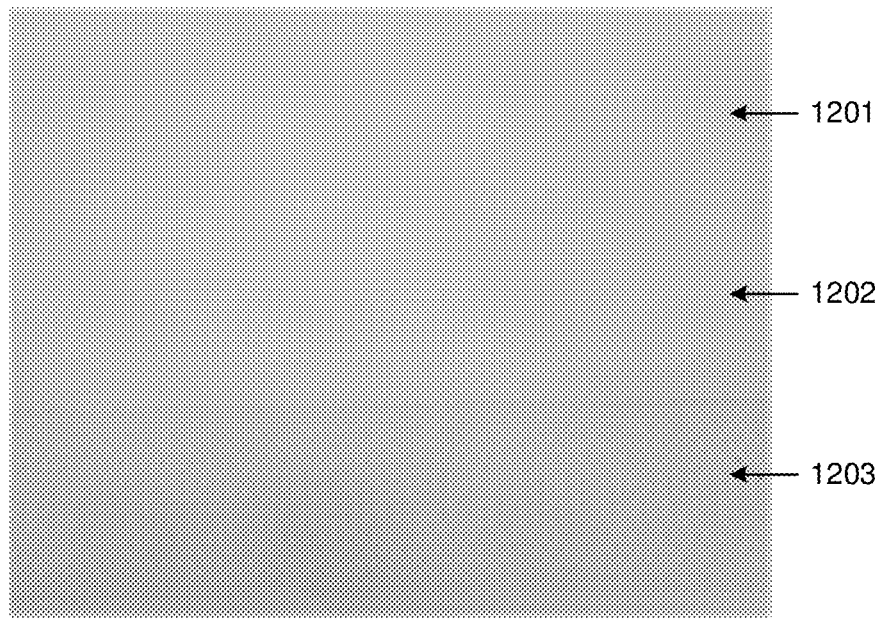
FIG. 17 is a photograph of write test samples made using the reverse photochromic ink formulations tested in FIG. 16, after exposure to UV light in a UV chamber.

As can be seen from comparing FIGS. 16 and 17, ink formulations 11-13 all erased well upon exposure to UV light in a UV chamber. However, further tests were performed to determine the lightfastness of ink formulations 11-13 upon exposure to environmental factors, such as ambient light and heat, to determine whether these inks would be inadvertently erased by ambient light or heat, which are likely to be encountered when these inks are used by consumers.

Figure 18:
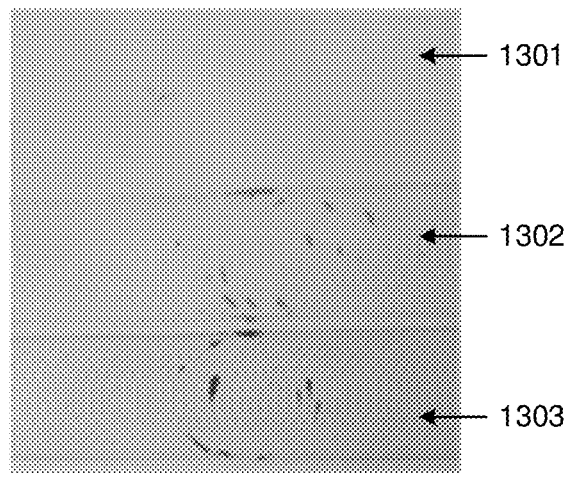
FIG. 18 is a photograph of write test samples made using the reverse photochromic ink formulations tested in FIG. 16, after exposure to ambient light for two weeks on a laboratory bench.

First, a cutout of the write trace was placed on a lab bench for two weeks, where it was exposed to the ambient fluorescent lighting conditions of the windowless lab. A photo of this cutout after two weeks on the lab bench is shown in FIG. 18, where the write traces made using formulations 11-13 are shown as 1301, 1302, and 1303, respectively. As can be seen by comparing FIG. 18 with FIG. 16, the write trace made using formulation 11 exhibited severe discoloration under these ambient lighting conditions, while the write traces made using formulations 12 and 13 exhibited only slight discoloration.

Figure 19:
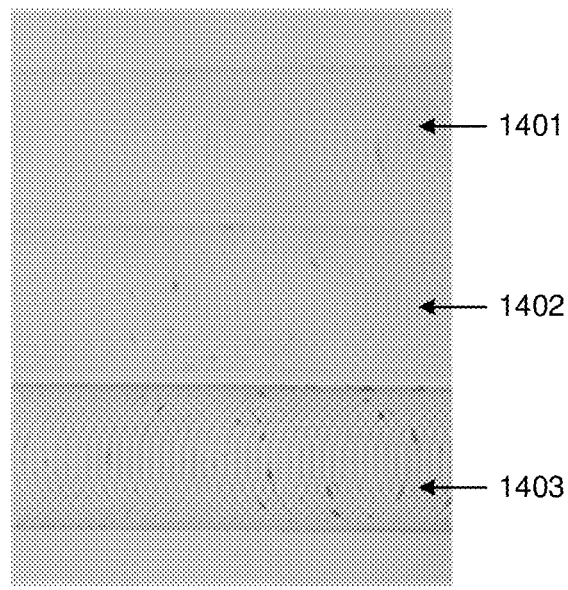
FIG. 19 is a photograph of write test samples made using the reverse photochromic ink formulations tested in FIG. 16, after being stored for two weeks in a closed laboratory drawer.

Next, a cutout of the write trace was placed in a closed lab drawer for two weeks. A photo of this cutout after two weeks in the lab drawer is shown in FIG. 19, where the write traces made using formulations 11-13 are shown as 1401, 1402, and 1403, respectively. As can be by comparing FIG. 19 with FIG. 16, no color change was observed in the write traces made using formulations 11-13.

Figure 20:
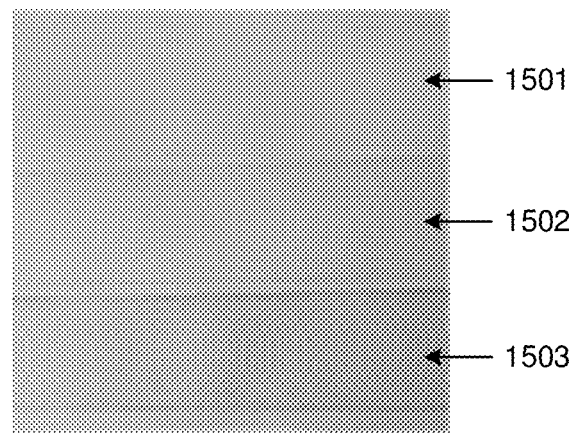
FIG. 20 is a photograph of write test samples made using the reverse photochromic ink formulations tested in FIG. 16, after exposure to ambient light for two weeks on an office wall.

Next, a cutout of the write trace was placed on an office wall, where it was exposed to the ambient lighting conditions of the office. The office lighting consisted of both fluorescent lighting and natural light from nearby windows. However, the samples were never exposed to direct sunlight through the windows, and zero UV light was measured at the location where the samples were stored. A photo of this cutout after two weeks on the office wall is shown in FIG. 20, where the write traces made using formulations 11-13 are shown as 1501, 1502, and 1503, respectively. As can be by comparing FIG. 20 with FIG. 16, the write trace made using formulation 11 exhibited moderate discoloration under these ambient lighting conditions, while the write traces made using formulations 12 and 13 exhibited only slight discoloration.

Figure 21:
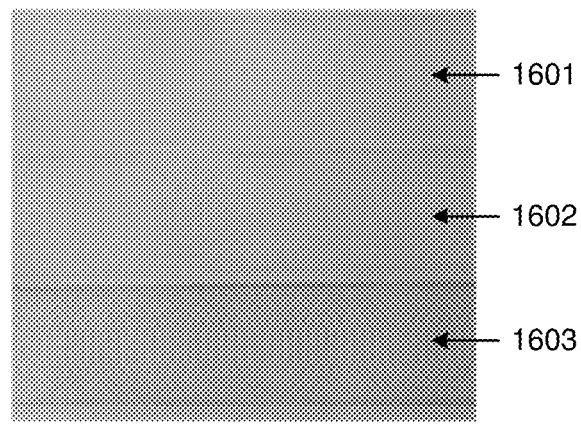
FIG. 21 is a photograph of write test samples made using the reverse photochromic ink formulations tested in FIG. 16, after being stored in a 60° C. oven for two weeks.

Finally, a cutout of the write trace was stored in a 60° C. dark windowless oven for two weeks. A photo of this cutout after two weeks on the office wall is shown in FIG. 21, where the write traces made using formulations 11-13 are shown as 1601, 1602, and 1603, respectively. As can be by comparing FIG. 21 with FIG. 16, the write trace made using formulation 11 exhibited moderate discoloration under these ambient lighting conditions, while the write traces made using formulations 12 and 13 exhibited only slight discoloration.

The color change of the write traces made using each of formulations 11-13 when exposed to each of the UV chamber, lab bench, office wall, lab drawer, and 60° C. oven was evaluated using the Likert scale, as shown in Table 6 below:

TABLE 6

| Formulation No. | UV Chamber | Lab Bench | Office Wall | Lab Drawer | 60° C. Oven |
|---|---|---|---|---|---|
| 11 | 1 | 2 | 3 | 5 | 3 |
| 12 | 1 | 4 | 4 | 5 | 4 |
| 13 | 2 | 4 | 4 | 5 | 4 |

While these ink formulations had some level of color stability under these limited tests, visible lightfastness clearly needs to be improved. In particular, these tests show that the blue ink of formulation 11 fades within a matter of days when exposed to ambient light, and the red and violet inks of formulations 12 and 13 fade within a matter of weeks.

Example 6: Permanently Colored Reverse Photochromic Ink Formulation

First, a reverse photochromic ink formulation was prepared consisting solely of CR234-BT2B colorant. The reverse photochromic ink formulation was placed on a drawdown bar, and a drawdown was created on Leneta Form 3NT-41 paper. Next, a UV-absorbing ink formulation was prepared consisting solely of Tinuvin® 477-DW. The UV-absorbing ink formulation was placed on a drawdown bar, and a drawdown of the UV-absorbing ink formulation was created on the top half of the reverse photochromic ink drawdown described above. Then, a variable power UV-LED head was used to expose the entire drawdown to 240 seconds of UV light having a wavelength of 340 nm and an irradiance of 19.5 W/cm$^2$.

Figure 22:
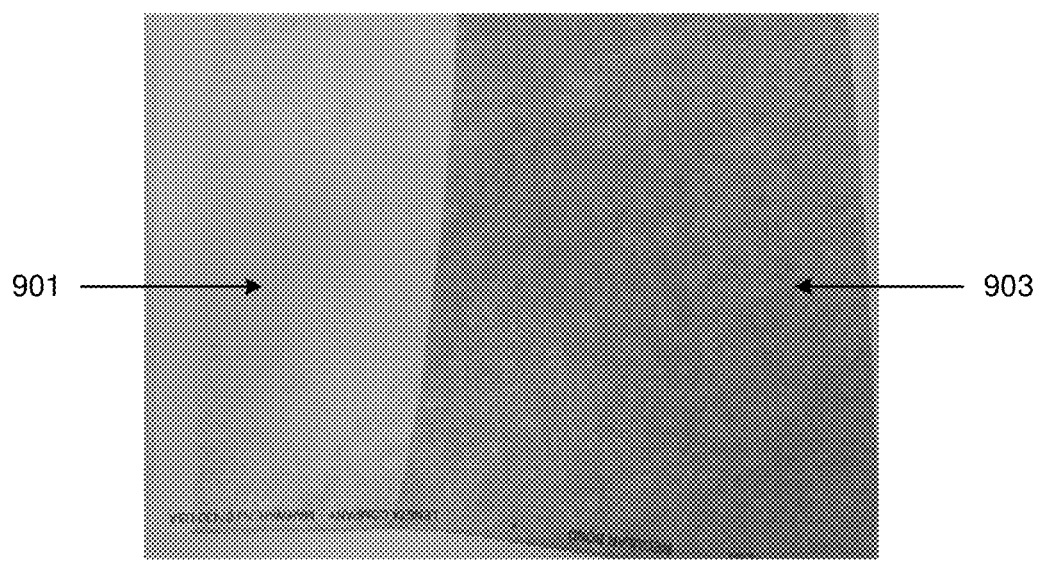
FIG. 22 is a photograph of drawdowns of an embodiment of a reverse photochromic formulation and an embodiment of a UV absorbing ink formulation.

FIG. 22 shows the drawdown after it was exposed to UV light. The reverse photochromic ink drawdown which was not treated with the UV-absorbing ink formulation is shown as 901 and the reverse photochromic ink drawdown which was covered in the UV-absorbing ink drawdown is shown as 903. As can be seen from this figure, the UV-absorbing ink drawdown successfully rendered the reverse photochromic ink drawdown permanently colored after a UV exposure, which rendered the untreated reverse photochromic ink formulation substantially erased.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An ink formulation comprising:
    a reverse photochromic colorant; and
    an activator or bleaching agent.

2. The ink formulation of claim 1, wherein the ink formulation contains the reverse photochromic colorant in an amount of from about 20 wt. % to about 100 wt. %.

3. The ink formulation of claim 1, further comprising a solvent, wherein the ink formulation contains the solvent in an amount of from about 20 wt. % to about 80 wt. %.

4. The ink formulation of claim 3, wherein the solvent comprises an alcohol, wherein the alcohol is benzyl alcohol, ethanol, n-propanol, n-butanol, diacetone alcohol, or a combination thereof.

5. The ink formulation of claim 1, further comprising a resin, wherein the ink formulation contains the resin in an amount of from about 10 wt. % to about 50 wt. %, wherein the resin comprises an acrylic resin.

6. A method of erasing ink comprising:
    disposing an ink formulation comprising a reverse photochromic colorant on a surface;
    exposing the surface to UV light,
    wherein the surface is white in color and wherein, after exposing the surface to UV light, the surface has a ΔE* value of from about 40 to about 100, a ΔL* value of from about 1 to about 100, a Δa* value of from about +/−0.1 to about +/−90, a Δb* value of from about +/−0.1 to about +/−90, or any combination thereof.

7. The method of claim 6, wherein the UV light comprises 340 nm UV light or 365 nm UV light.

8. The method of claim 6, wherein exposing the surface to UV light comprises exposing the surface to a UV light source having an irradiance of, less than 100,000 mW/cm$^2$ of 340 nm UV light, less than 245,000 mW/cm$^2$ of 365 nm UV light, or less than 909,000 mW/cm$^2$ of 400 nm UV light.

9. The method of claim 6, wherein exposing the surface to UV light comprises exposing the surface to a 340 nm to 400 nm UV light source having an irradiance of from about 1 mW/cm$^2$ to about 30 mW/cm$^2$ for a time period of from about one second to about 5 minutes.

10. A method of erasing ink comprising:
    disposing an ink formulation comprising a reverse photochromic colorant on a surface;
    exposing the surface to UV light; and
    disposing a UV absorbing ink formulation on the reverse photochromic ink formulation that is disposed on the surface, prior to exposing the surface to UV light,
    wherein the UV absorbing ink formulation comprises a UV absorber.

11. The method of claim 10, wherein the UV absorbing ink formulation contains the UV absorber in an amount of from about 1 wt. % to about 20 wt. %.

12. The method of claim 10, wherein the UV absorber comprises 2-hydroxy-benzophenone, oxalanilide, 2-(2-hydroxyphenyl)-benzotriazole, hydroxyphenyl-s-triazine ("HPT"), any derivatives thereof, or any combination thereof.

13. The method of claim 10, wherein the UV absorbing ink formulation further comprises a solvent, wherein the UV absorbing ink formulation contains the solvent in an amount of from about 20 wt. % to about 80 wt. %.

14. The method of claim 10, wherein the UV absorbing ink formulation further comprises a resin.

15. The method of claim 14, wherein the UV absorbing ink formulation contains the resin in an amount of from about 10 wt. % to about 50 wt. %.

16. The method of claim 10, wherein the surface is white in color and wherein, after exposing the surface to UV light, the surface has a ΔE* value of less than about 1, a ΔL* value of less than about 0.5, a Δa* value of from about −0.5 to about 0.05, a Δb* value of from about −0.5 to about 0.5, or any combination thereof.

17. The method of claim 10, wherein the UV light comprises 340 nm UV light or 365 nm UV light.

18. The method of claim 10, wherein exposing the surface to UV light comprises exposing the surface to a UV light source having an irradiance of, less than 100,000 mW/cm$^2$ of 340 nm UV light, less than 245,000 mW/cm$^2$ of 365 nm UV light, or less than 909,000 mW/cm$^2$ of 400 nm UV light.

19. The method of claim 10, wherein exposing the surface to UV light comprises exposing the surface to a 340 nm to 400 nm UV light source having an irradiance of from about 1 mW/cm$^2$ to about 30 mW/cm$^2$ for a time period of from about one second to about 5 minutes.

* * * * *